United States Patent
Okeya

(10) Patent No.: US 7,046,801 B2
(45) Date of Patent: May 16, 2006

(54) METHOD OF CALCULATING MULTIPLICATION BY SCALARS ON AN ELLIPTIC CURVE AND APPARATUS USING SAME AND RECORDING MEDIUM

(75) Inventor: Katsuyuki Okeya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 722 days.

(21) Appl. No.: 09/811,459

(22) Filed: Mar. 20, 2001

(65) Prior Publication Data

US 2001/0048741 A1 Dec. 6, 2001

(30) Foreign Application Priority Data

May 30, 2000 (JP) ........................................ 2000-160001

(51) Int. Cl.
*H04K 1/00* (2006.01)

(52) U.S. Cl. ........................................................ 380/28
(58) Field of Classification Search .................... 380/28
See application file for complete search history.

(56) References Cited

U.S. PATENT DOCUMENTS 5,854,759 A * 12/1998 Kaliski et al. .............. 708/492
5,987,131 A * 11/1999 Clapp .......................... 713/171

FOREIGN PATENT DOCUMENTS

| EP | 0 981 115 A2 | 2/2000 |
|---|---|---|
| WO | 0025204 | 5/2000 |

OTHER PUBLICATIONS

J. Lopez, "Fast Multiplication on Elliptic Curves over $GF(2^m)$ without Precomputation", Cryptographic Hardware and Embedded Systems, $1^{st}$ International Workshop, Ches '99, 1999 Proceedings, Lecture Notes in Computer Science, vol. 1717, Aug. 12, 1999, pp. 316–327.
Proceedings of CRYPTO '99, LNCS 1666, Springer–Verlag, (1999) pp. 388–397.
Proceedings of CHES '99, LNCS 1717, Springer–Verlag, (1999) pp. 292–302, 316–327.
Math. Comp. 48 (1987) pp. 243–264.

* cited by examiner

*Primary Examiner*—Gregory Morse
*Assistant Examiner*—Jacob Lipman
(74) *Attorney, Agent, or Firm*—Mattingly, Stanger, Malur & Brundidge, P.C.

(57) ABSTRACT

A cryptographic processing method in which dependence of cryptographic processing process and secret information on each other is cut off; and in which, when a scalar multiplied point is calculated from a scalar value and a point on an elliptic curve in an elliptic curve cryptosystem, a value of a bit of the scalar value is judged; and in which operations on the elliptic curve are executed a predetermined times and in a predetermined order without depending on the judged value of the bit.

22 Claims, 28 Drawing Sheets

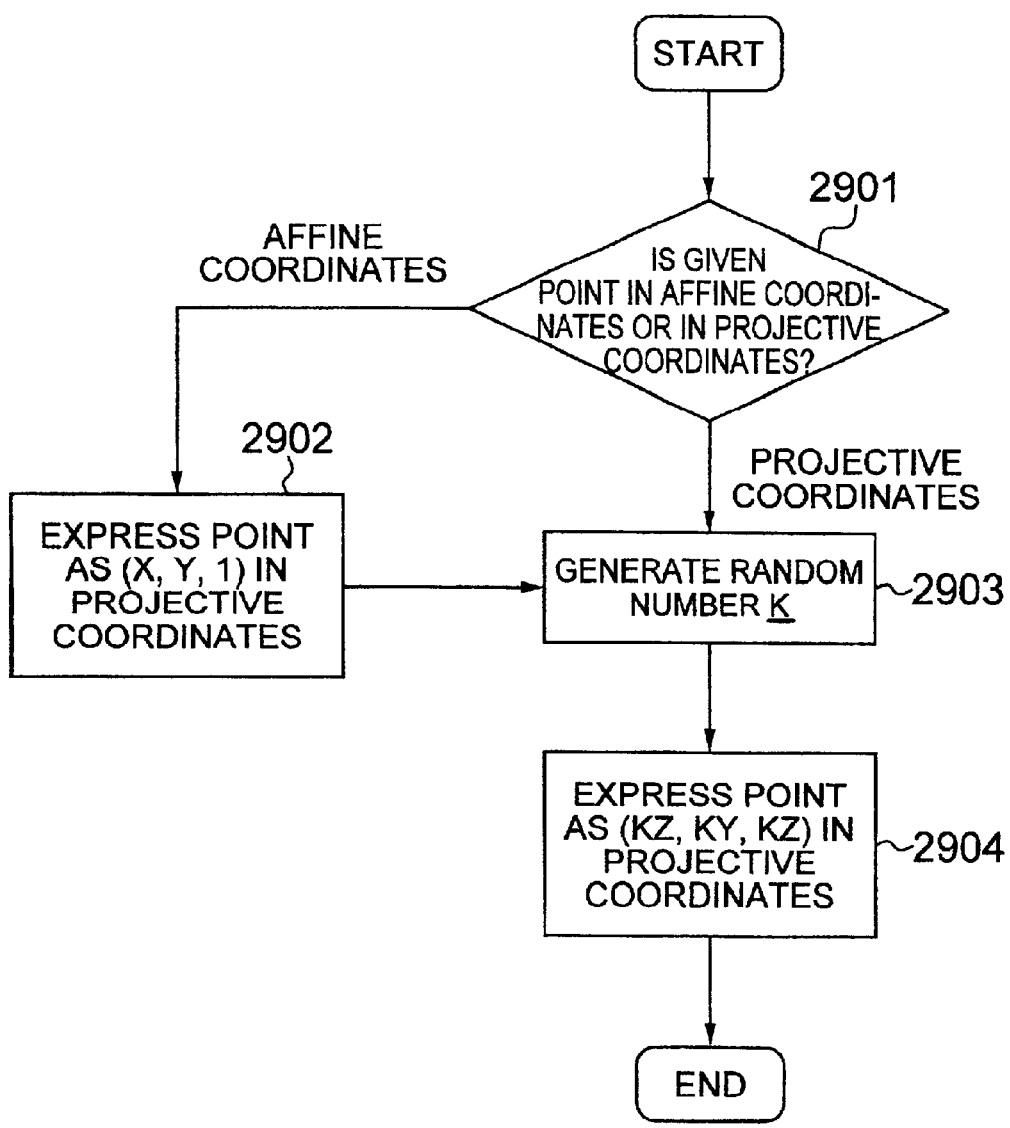

METHOD OF CALCULATING MULTIPLICATION BY SCALARS ON AN ELLIPTIC CURVE AND APPARATUS USING SAME AND RECORDING MEDIUM

BACKGROUND OF THE INVENTION

The present invention relates to security technology in a computer network, and particularly relates to a method and an apparatus for cryptographic processing in an elliptic curve cryptosystem and a recording medium.

An elliptic curve cryptosystem is a kind of public key cryptosystem proposed by N. Koblitz and V. S. Miller. The public key cryptosystem generally includes information called a public key, which may be made open to the public, and information called a private key, which must be kept secret. The public key is used for encryption or signature verification of a given message, and the private key is used for decryption or signature generation of the given message. The private key in the elliptic curve cryptosystem depends on a scalar value. In addition, the security of the elliptic curve cryptosystem results from difficulty in solving an elliptic curve discrete logarithm problem. Here, the elliptic curve discrete logarithm problem means a problem of obtaining a scalar value $\underline{d}$ when there are provided a point P which is on an elliptic curve and a point dP which is a scalar multiple of the point P. Herein, any point on the elliptic curve designates a set of numbers satisfying a definition equation of the elliptic curve. An operation using a virtual point called a point at infinity as an identity element, that is, addition on the elliptic curve is defined for all points on the elliptic curve. Then, addition of a point to the point itself on the elliptic curve is particularly called doubling on the elliptic curve. A scalar multiplication designates that an addition is applied to a point a specific number of times. A scalar multiplied point designates the result of the scalar multiplication, and a scalar value designates the number of times.

The difficulty in solving the elliptic curve discrete logarithm problem has been established theoretically while information associated with secret information such as the private key or the like may leak out in cryptographic processing in real mounting. Thus, there has been proposed an attack method of so-called power analysis in which the secret information is decrypted on the basis of the leak information.

An attack method in which change in voltage is measured in cryptographic processing using secret information such as DES (Data Encryption Standard) or the like, so that the process of the cryptographic processing is obtained and the secret information is inferred on the basis of the obtained process is disclosed in P. Kocher, J. Jaffe and B. Jun Differential Power Analysis, Advances in Cryptology: Proceedings of CRYPTO '99, LNCS 1666, Springer-Verlag, (1999) pp. 388–397. This attack method is called DPA (Differential Power Analysis).

An elliptic curve cryptosystem to which the above-mentioned attack method is applied is disclosed in J. Coron, Resistance against Differential Power Analysis for Elliptic Curve Cryptosystems, Cryptographic Hardware and Embedded Systems: Proceedings of CHES '99, LNCS 1717, Springer-Verlag, (1999) pp. 292–302. In the elliptic curve cryptosystem, encryption, decryption, signature generation and signature verification of a given message have to be carried out with elliptic curve operations. Particularly, calculation of scalar multiplication on an elliptic curve is used in cryptographic processing using a scalar value as secret information.

On the other hand, P. L. Montgomery, Speeding the Pollard and Elliptic Curve Methods of Factorization, Math. Comp. 48 (1987) pp. 243–264 discloses that by use of a Montgomery-form elliptic curve $BY^2=X^3+AX^2+X$ (A, B∈Fp), operations can be executed at a higher speed than by use of an elliptic curve called a Weierstrass-form elliptic curve which is in general use. This results from the fact that calculation time of addition and doubling is shortened by use of a Montgomery-form elliptic curve in the following scalar multiplication calculation method. That is, in the scalar multiplication calculation method, a pair of points (2mP, (2m+1)P) or a pair of points ((2m+1)P, (2m+2)P) is repeatedly calculated from a pair of points (mP, (m+1)P) on an elliptic curve dependently on the value of a specific bit of a scalar value.

In addition, J. Lopez and R. Dahab, Fast Multiplication on Elliptic Curve over GF(2m) without Precomputation, Cryptographic Hardware and Embedded Systems: Proceedings of CHES '99, LNCS 1717, Springer-Verlag, (1999) pp. 316–327 discloses a scalar multiplication calculation method in which a scalar multiplication calculation method in a Montgomery-form elliptic curve is applied also to an elliptic curve defined on a finite field of characteristic 2; an addition method and a doubling method for use in the scalar multiplication calculation method. In the scalar multiplication calculation method, calculation time of addition and doubling is shortened. Accordingly, scalar multiplication calculation can be executed at a higher speed than in a general scalar multiplication calculation method in an elliptic curve defined on a finite field of characteristic 2.

As one of measures against DPA attack on elliptic curve cryptosystems, a method using randomized projective coordinates is disclosed in J. Coron, Resistance against Differential Power Analysis for Elliptic Curve Cryptosystems, Cryptographic Hardware and Embedded Systems: Proceedings of CHES '99, LNCS 1717, Springer-Verlag, (1999) pp. 292–302. This is a measure against an attack method of observing whether a specific value appears or not in scalar multiplication calculation, and inferring a scalar value from the observing result. That is, by multiplication with a random value, the appearance of such a specific value is prevented from being inferred.

In the above-mentioned background-art elliptic curve cryptosystem, attack by power analysis such as DPA or the like was not taken into consideration. Therefore, to relieve the attack by power analysis, extra calculation, or the like, other than necessary calculation had to be carried out in cryptographic processing using secret information so as to weaken the dependence of the process of the cryptographic processing and the secret information on each other. Thus, time required for the cryptographic processing increased so that cryptographic processing efficiency was lowered conspicuously in a computer such as an IC card, or the like, which was slow in calculation speed, a server managing an enormous number of cryptographic processes, or the like. In addition, the dependence of cryptographic processing process and secret information on each other cannot be cut off perfectly. In addition, if priority was given to the cryptographic processing efficiency, the cryptosystem was apt to come under attack by power analysis so that there was a possibility that secret information leaks out.

SUMMARY OF THE INVENTION

It is an object of the present invention to provide a method and an apparatus for cryptographic processing and a recording medium in which secret information itself does not leak out even if cryptographic processing process leaks out by power analysis or the like, and in which cryptographic processing can be executed at a high speed. Particularly, it is an object of the present invention to provide a scalar multiplication calculation method in which information of any scalar value as secret information cannot be inferred from calculation process of calculating a scalar multiplied point on an elliptic curve from the scalar value.

In order to achieve the above object, according to an aspect of the present invention, there is provided a scalar multiplication calculation method for calculating a scalar multiplied point on the basis of a scalar value and a point on an elliptic curve in an elliptic curve cryptosystem, comprising the steps of: judging a value of a bit of the scalar value; and executing operations on the elliptic curve a predetermined number of times and in a predetermined order without depending on the judged value of the bit.

Further, according to another aspect of the present invention, there is provided a scalar multiplication calculation method for calculating a scalar multiplied point on the basis of a scalar value and a point on an elliptic curve in an elliptic curve cryptosystem, comprising the steps of: judging a value of a bit of the scalar value; and executing addition on the elliptic curve and doubling on the elliptic curve in the order that the doubling on the elliptic curve is executed after the addition on the elliptic curve is executed.

Further, according to another aspect of the present invention, there is provided a scalar multiplication calculation method for calculating a scalar multiplied point on the basis of a scalar value and a point on an elliptic curve in an elliptic curve cryptosystem, comprising the steps of: judging a value of a bit of the scalar value; and executing addition on the elliptic curve and doubling on the elliptic curve in the order that the addition on the elliptic curve is executed after the doubling on the elliptic curve is executed.

Further, according to another aspect of the present invention, there is provided a scalar multiplication calculation method for calculating a scalar multiplied point on the basis of a scalar value and a point on an elliptic curve in an elliptic curve cryptosystem, comprising the steps of: judging a value of a bit of the scalar value; and executing addition on the elliptic curve and doubling on the elliptic curve simultaneously.

Further, according to another aspect of the present invention, there is provided a scalar multiplication calculation method for calculating a scalar multiplied point on the basis of a scalar value and a point on an elliptic curve in an elliptic curve cryptosystem, comprising the steps of: executing addition on the elliptic curve; judging a value of a bit of the scalar value; and executing doubling on the elliptic curve.

Further, according to another aspect of the present invention, there is provided a scalar multiplication calculation method for calculating a scalar multiplied point on the basis of a scalar value and a point on an elliptic curve in an elliptic curve cryptosystem, comprising the steps of: randomizing calculation order of addition on the elliptic curve and doubling on the elliptic curve; judging a value of a bit of the scalar value; and executing the addition on the elliptic curve and the doubling on the elliptic curve in the order randomized by the step of randomizing calculation order of addition on the elliptic curve and doubling on the elliptic curve.

Further, according to another aspect of the present invention, there is provided a scalar multiplication calculation method for calculating a scalar multiplied point on the basis of a scalar value and a point on an elliptic curve in an elliptic curve cryptosystem, comprising the steps of: judging a value of a bit of the scalar value; randomizing calculation order of addition on the elliptic curve and doubling on the elliptic curve; and executing the addition on the elliptic curve and the doubling on the elliptic curve in the order randomized by the step of randomizing calculation order of addition on the elliptic curve and doubling on the elliptic curve.

Further, according to another aspect of the present invention, there is provided a data generation method for generating second data from first data, comprising the step of calculating a scalar multiplication by use of any one of the above-mentioned scalar multiplication calculation methods. Further, according to another aspect of the present invention, there is provided a signature generation method for generating signature data from data, comprising the step of calculating a scalar multiplication by use of any one of the above-mentioned scalar multiplication calculation methods. In addition, according to another aspect of the present invention, there is provided a decryption method for generating decrypted data from encrypted data, comprising the step of calculating a scalar multiplication by use of any one of the above-mentioned scalar multiplication calculation methods.

Further, according to another aspect of the present invention, there is provided a scalar multiplication calculator for calculating a scalar multiplied point on the basis of a scalar value and a point on an elliptic curve in an elliptic curve cryptosystem, comprising: bit value judgement means for judging a value of a bit of the scalar value; addition operation means for executing addition on the elliptic curve; and doubling operation means for executing doubling on the elliptic curve; wherein after the value of the bit of scalar value is judged by the bit value judgement means, the addition on the elliptic curve and the doubling on the elliptic curve are executed by the addition operation means and the doubling operation means a predetermined number of times and in a predetermined order so as to calculate a scalar multiplied point.

Further, according to another aspect of the present invention, there is provided a recording medium for storing a program relating to any one of the above-mentioned scalar multiplication calculation methods. Preferably, a Montgomery-form elliptic curve may be used as the elliptic curve. Preferably, an elliptic curve defined on a finite field of characteristic 2 may be used as the elliptic curve.

As has been described above, according to the present invention, in cryptographic processing using secret information in a cryptographic processing system, dependence of cryptographic processing process and secret information on each other is cut off perfectly. Therefore, even if the cryptographic processing process leaks out, the secret information does not leak. In addition, when an elliptic curve to be used is formed into a Montgomery-form elliptic curve, the cryptographic processing can be made high in speed. Likewise, when an elliptic curve defined on a finite field of characteristic 2 is used as the elliptic curve, the cryptographic processing can be made high in speed.

BRIEF DESCRIPTION OF DRAWINGS

FIG. 29 is a flow chart showing a randomized projective coordinates converting method in the randomized projective coordinates converter.

DETAILED DESCRIPTION OF EMBODIMENTS

A mode for carrying out the present invention will be described below with reference to the drawings.

Figure 11:
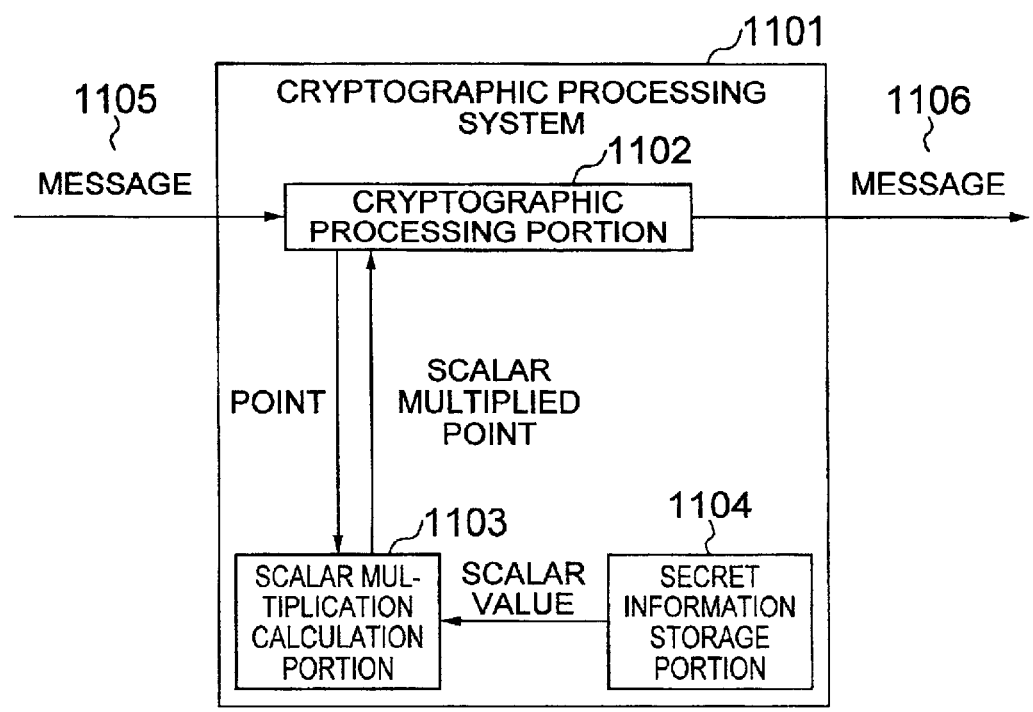
FIG. 11 is a configuration view of a cryptographic processing system according to a mode of carrying out the present invention.

FIG. 11 is a configuration view of a cryptographic processing system according to the mode for carrying out the present invention. This cryptographic processing system 1101 is provided, for example, in an IC card. When a message (value) 1105 is inputted for encryption (or decryption, or signature generation or verification), processing is carried out to make a predetermined calculation and output a message (value) 1106. The cryptographic processing system 1101 has a cryptographic processing portion 1102, a scalar multiplication calculation portion 1103, and a secret information storage portion 1104. Particularly, the scalar multiplication calculating portion 1103 in this mode does not leak secret information even if scalar multiplication calculation process leaks out. Thus, the cryptographic processing system 1101 is formed as a system which does not leak secret information even if cryptographic processing process leaks out.

Figure 16:
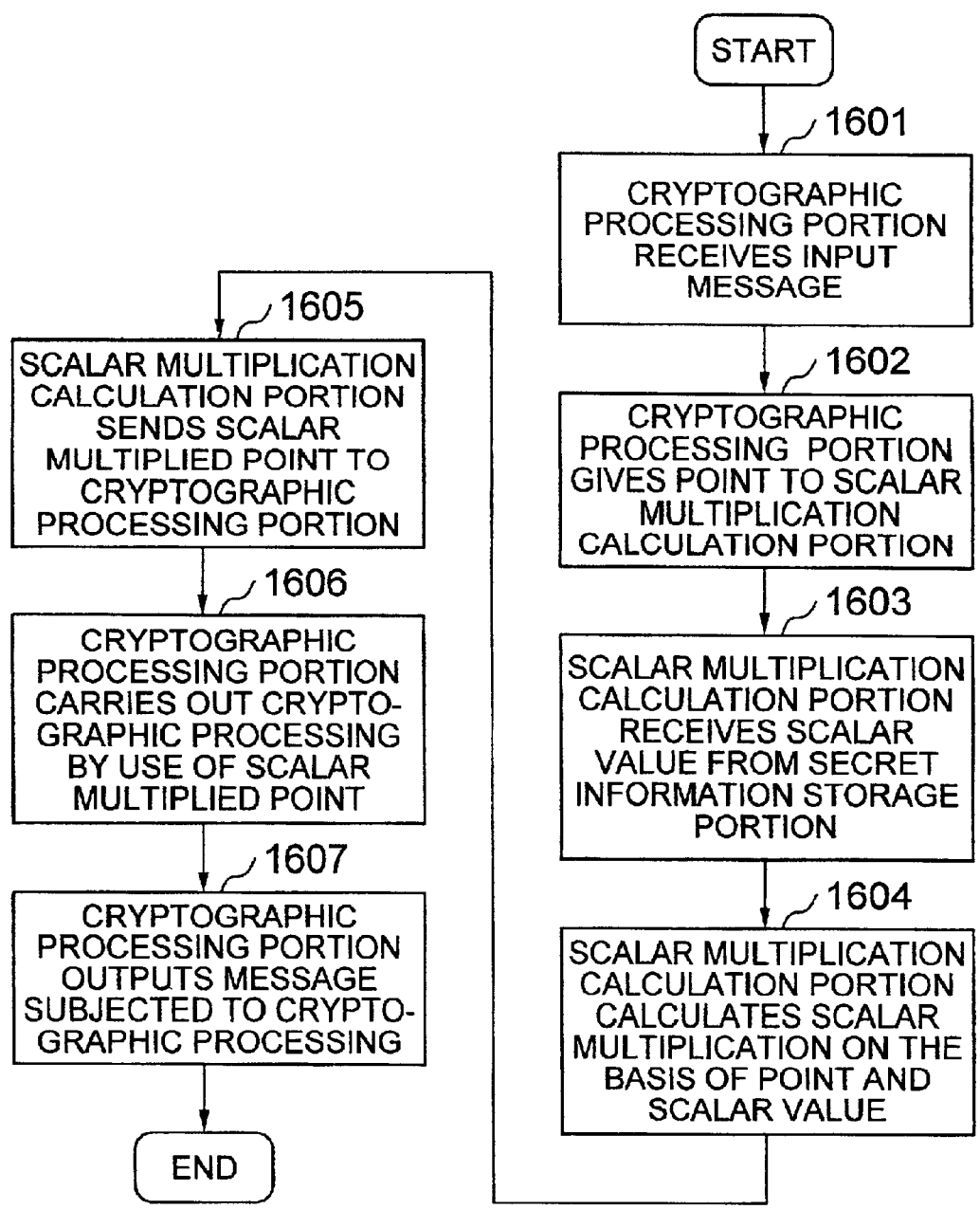
FIG. 16 is a flow chart showing a cryptographic processing method in the cryptographic processing system in FIG. 11.
Figure 17:
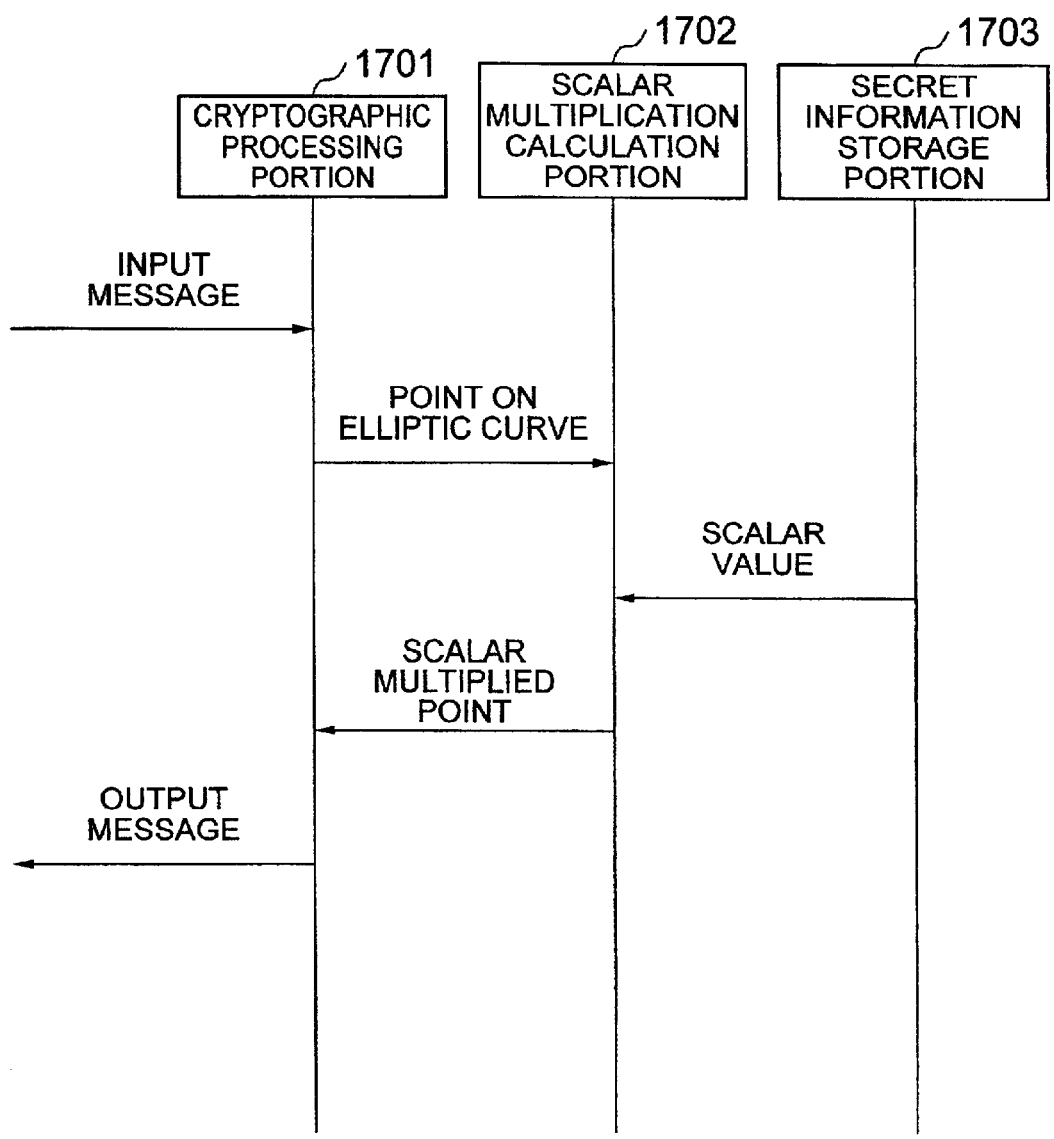
FIG. 17 is a sequence view showing a flow of processing in the cryptographic processing system in FIG. 11.

FIG. 16 is a flow chart showing a flow of processing in the cryptographic processing system in FIG. 11. FIG. 17 is a sequence view showing a flow of processing in the cryptographic processing system in FIG. 11.

In FIG. 16, the cryptographic processing system 1101 outputs the message 1106 subjected to cryptographic processing on the basis of the given message 1105, in the following manner. First, when the message 1105 is supplied to the cryptographic processing system 1101, the cryptographic processing portion 1102 receives the message 1105 (Step 1601). The cryptographic processing portion 1102 gives the scalar multiplication calculation portion 1103 a point on an elliptic curve corresponding to the input message 1105 (Step 1602). The scalar multiplication calculation portion 1103 receives a scalar value, which is secret information, from the secret information storage portion 1104 (Step 1603). The scalar multiplication calculation portion 1103 calculates a scalar multiplied point on the basis of the received point and the received scalar value in such a scalar multiplication calculation method that secret information does not leak out even if scalar multiplication calculation process leaks out (Step 1604). The scalar multiplication calculation portion 1103 sends the calculated scalar multiplication point to the cryptographic processing portion 1102 (Step 1605). The cryptographic processing portion 1102 carries out cryptographic processing on the basis of the scalar multiplied point received from the scalar multiplication calculation portion 1103 (Step 1606). The cryptographic processing portion 1102 outputs a message 1106 as a result of the cryptographic processing (Step 1607).

The above-mentioned processing procedure will be described with reference to the sequence view of FIG. 17. First, description will be made about processing executed by a cryptographic processing portion 1701 (1102 in FIG. 11). The cryptographic processing portion 1701 receives an input message. The cryptographic processing portion 1701 selects a point on an elliptic curve on the basis of the input message, gives a scalar multiplication calculation portion 1702 the point on the elliptic curve, and receives a scalar multiplied point from the scalar multiplication calculation portion 1702. The cryptographic processing portion 1701 carries out cryptographic processing by use of the received scalar multiplied point, and outputs an output message as a result of the cryptographic processing.

Next, description will be made about processing executed by the scalar multiplication calculation portion 1702 (1103 in FIG. 11). The scalar multiplication calculation portion 1702 receives a point on an elliptic curve from the cryptographic processing portion 1701. The scalar multiplication calculation portion 1702 receives a scalar value from a secret information storage portion 1703. The scalar multiplication calculation portion 1702 calculates a scalar multiplied point on the basis of the received point on the elliptic curve and the received scalar value in such a scalar multiplication calculation method that secret information does not leak even if scalar multiplication calculation process leaks out. Then, the scalar multiplication calculation portion 1702 sends the scalar multiplied point to the cryptographic processing portion 1701.

Last, description will be made about processing executed by the secret information storage portion 1703 (1104 in FIG. 11). The secret information storage portion 1703 sends a scalar value to the scalar multiplication calculation portion 1702 so that the scalar multiplication calculation portion 1702 can calculate a scalar multiplied value.

The scalar multiplication calculation carried out by the scalar multiplication calculation portion 1103 does not leak information about the scalar value, which is secret information, even if the scalar multiplication calculation process leaks out. Accordingly, even if the cryptographic processing process leaks out when the cryptographic processing portion 1102 carries out cryptographic processing, information about secret information does not leak out. This is because only the scalar multiplication calculation portion 1103 deals with the scalar value which is the secret information.

Next, a specific embodiment of the scalar multiplication calculation portion 1103 in the cryptographic processing system 1101 will be described.

Figure 1:
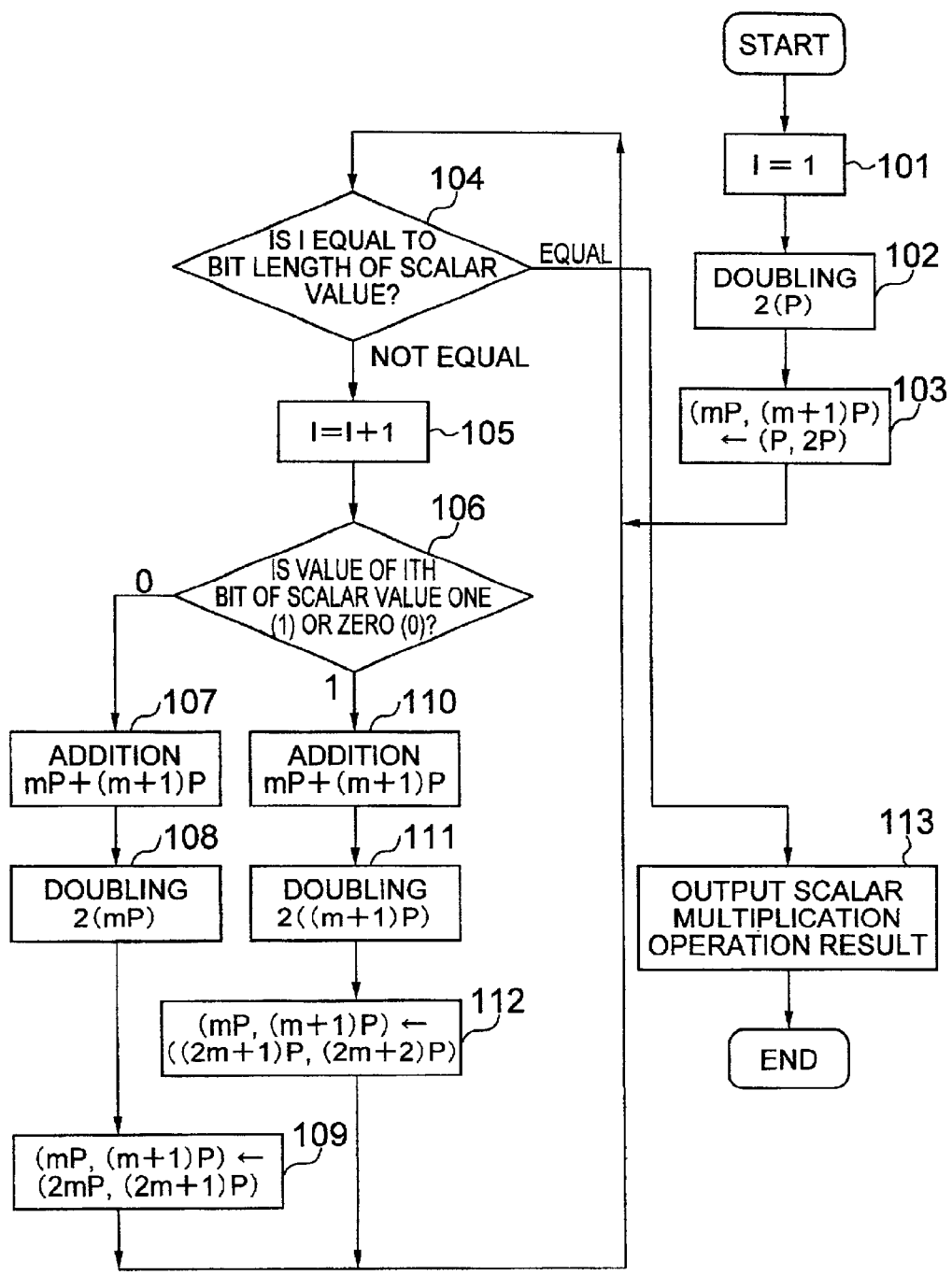
FIG. 1 is a flow chart showing a scalar multiplication calculation method according to a first embodiment of the present invention.
Figure 2:
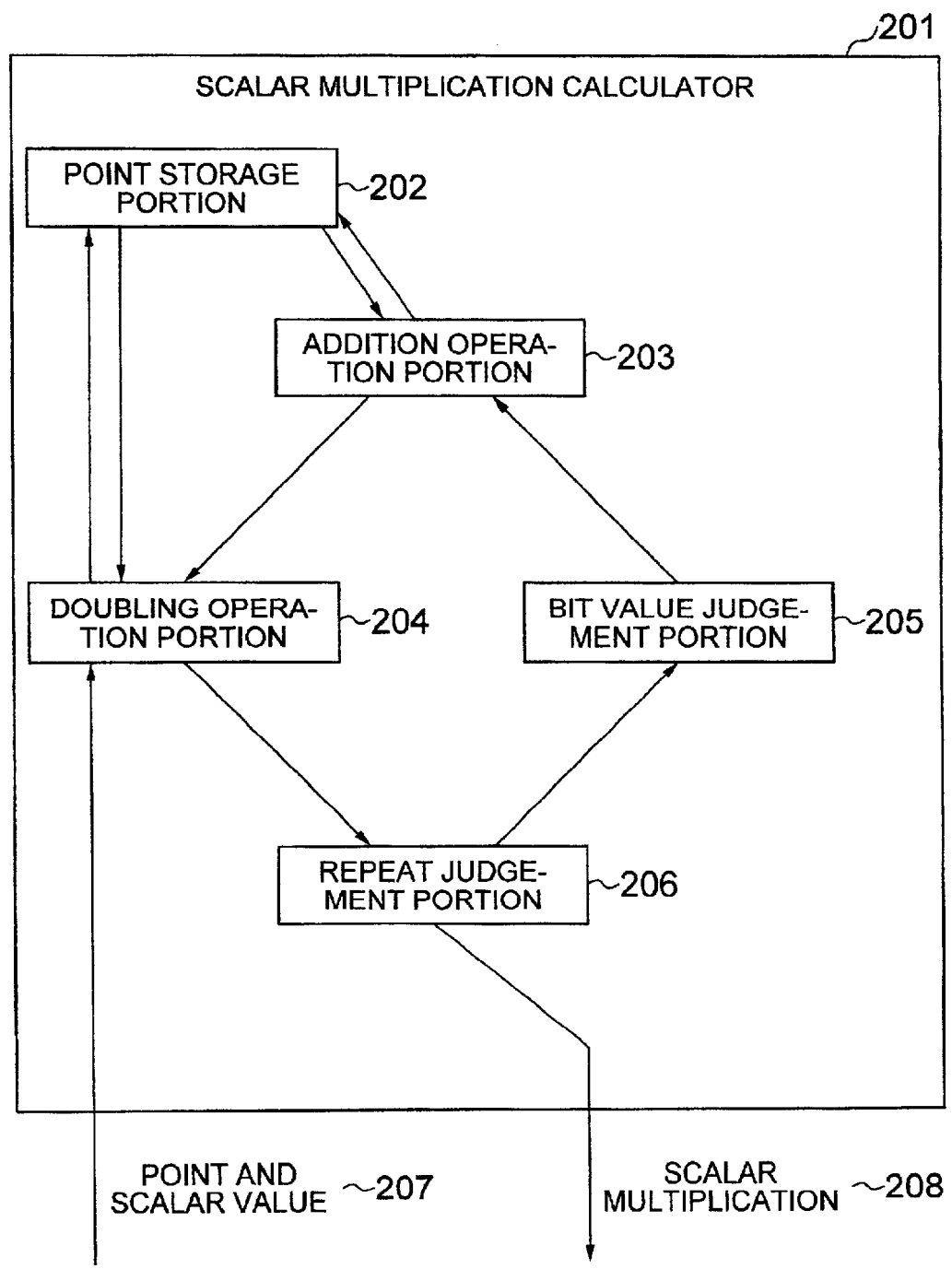
FIG. 2 is a view showing a flow of processing in the scalar multiplication calculation method and an apparatus therefor according to the first embodiment.

FIG. 2 is a view showing a first embodiment of a scalar multiplication calculation method in which secret information does not leak out even if cryptographic processing process leaks out in cryptographic processing using the secret information in the cryptographic processing system 1101. FIG. 1 is a flow chart showing the scalar multiplication calculation method according to the first embodiment. The first embodiment will be described with reference to FIGS. 1 and 2.

In a scalar multiplication calculator 201, a point and a scalar value 207 are inputted, and a scalar multiplication 208 is outputted in the following procedure. Here, assume that the input point, the input scalar value and a scalar multiplied point to be outputted are expressed by P, $\underline{d}$ and dP, respectively.

In Step 101, 1 is substituted for a variable I as its initial value in order to make judgement in a repeat judgement portion 206 as to whether repeat should be done or not. In Step 102, a double point 2P of the point P is calculated by a doubling operation portion 204. In Step 103, the point P supplied to the scalar multiplication calculator 201 and the point 2P obtained in Step 102 are stored in a point storage portion 202 as a point pair (P, 2P). In Step 104, judgement is made by the repeat judgement portion 206 as to whether the variable I and bit length of the scalar value are coincident with each other or not. If both the variable I and the scalar value are coincident with each other, the processing goes to Step 113. If not, the processing goes to Step 105. In Step 105, the variable I is increased by 1. In Step 106, judgement is made by a bit value judgement portion 205 as to whether the value of the $I^{th}$ bit of the scalar value is 0 or 1. If the value of the $I^{th}$ bit is 0, the processing goes to Step 107. If the value of the $I^{th}$ bit is 1, the processing goes to Step 110.

In Step 107, by an addition operation portion 203, addition mP+(m+1)P between a point mP and a point (m+1)P is carried out on the basis of a point pair (mP, (m+1)P) stored in the point storage portion 202. Thus, a point (2m+1)P is calculated. Then, the processing goes to Step 108. In Step 108, by the doubling operation portion 204, doubling 2(mP) of the point mP is carried out on the basis of the point pair (mP, (m+1)P) stored in the point storage portion 202. Thus, a point 2mP is calculated. Then, the processing goes to Step 109. In Step 109, the point 2mP obtained in Step 108 and the point (2m+1)P obtained in Step 107 are stored in the point storage portion 202 as a point pair (2mP, (2m+1)P) in place of the point pair (mP, (m+1)P). Then, the processing returns to Step 104.

In Step 110, by an addition operation portion 203, addition mP+(m+1)P between a point mP and a point (m+1)P is carried out on the basis of a point pair (mP, (m+1)P) stored in the point storage portion 202. Thus, a point (2m+1)P is calculated. Then, the processing goes to Step 111. In Step 111, by the doubling operation portion 204, doubling 2((m+1)P) of the point (m+1)P is carried out on the basis of the point pair (mP, (m+1)P) stored in the point storage portion 202. Thus, a point (2m+2)P is calculated. Then, the processing goes to Step 112. In Step 112, the point (2m+1)P obtained in Step 110 and the point (2m+2)P obtained in Step 111 are stored in the point storage portion 202 as a point pair ((2m+1)P, (2m+2)P) in place of the point pair (mP, (m+1)P). Then, the processing returns to Step 104.

In Step 113, the point mP is outputted as the scalar multiplication 208 on the basis of the point pair (mP, (m+1)P) stored in the point storage portion 202. Thus, the processing is terminated.

The point mP, which is a value outputted by the above-mentioned procedure, is in keeping with the scalar multiplied point dP which is obtained by multiplying the point P by the scalar value $\underline{d}$. This is proved by the fact that a scalar value m with respect to the point mP of the point pair (mP, (m+1)P) stored in the calculation process has to be coincident with the bit string of top I bits in the scalar value $\underline{d}$, and in addition, by the fact that, in order to make a conclusion in Step 104 that the processing goes to Step 113, the variable I and the bit length of scalar value $\underline{d}$ have to be coincident with each other. That is, by the fact that the scalar value m is coincident with the scalar value $\underline{d}$, it is proved that the point mP is in keeping with the scalar multiplied point dP.

On the other hand, the reason why information about a scalar value as secret information does not leak out even if scalar multiplication calculation process leaks out in the above-mentioned procedure is just as follow. To obtain information about a scalar value on the basis of calculation process, there has to be at least a difference between calculation process for one scalar value and calculation process for another. First, consideration will be made about two scalar values different only in a specific bit from each other. The difference in the specific bit makes a difference as to whether the processing goes to Step 107 or to Step 110 after the judgement of bit values in Step 106 after operations are repeated a specific number of times in the calculation process. However, whichever the processing goes to Step 107 or to Step 110, the same steps are taken thereafter. That is, after Step 107 and Step 110, addition is first carried out, doubling is next carried out, and then the result is stored as a point pair. Then, the processing returns to Step 104. Accordingly, there is no difference in calculation process. Therefore, because the same calculation process is adopted, it is impossible to take out information of any scalar value.

Next, description will be made about scalar values having fixed bit length. Two scalar values having the same bit length are different in some bit values. Assume that the number of bits different in value is $\underline{k}$, and the two given scalar values are $d_0$ and $d_k$ respectively. A scalar value $d_1$ is defined so that the value of a bit corresponding to first different-value bits of the scalar values $d_0$ and $d_k$ is equal to the value of the corresponding bit of the scalar value $d_k$, and the values of the other bits are equal to the values of the corresponding bits of the scalar value $d_0$ respectively. The scalar values $d_0$ and $d_1$ are different only in one bit value. Next, a scalar value $d_2$ is defined so that the value of a bit corresponding to first different-value bits of the scalar values $d_1$ and $d_k$ is equal to the value of the corresponding bit of the scalar value $d_k$, and the values of the other bits are equal to the values of the corresponding bits of the scalar value $d_1$ respectively. The scalar values $d_1$ and $d_2$ are different only in one bit value. In the same manner, scalar values $d_3$ to $d_{k-1}$ are defined. Since the scalar values $d_0$ and $d_k$ are different in $k^{th}$ bit values, the scalar values $d_{k-1}$ and $d_k$ are different only in one bit value. Accordingly, scalar values different from each other only by one in the subscript are different only in one bit value from each other. As described above, scalar values different only in one bit value go through the same calculation process. Since there is a chain of the scalar values $d_0$ to $d_k$ which are different only in one bit value respectively, the scalar values $d_0$ and $d_k$ go through the same calculation process. It is therefore impossible to take out information of any scalar value from the calculation process.

In addition, if a Montgomery-form elliptic curve is used as the elliptic curve, addition and doubling can be carried out at a high speed. Thus, scalar multiplication calculation can be carried out at a higher speed than in a Weierstrass-form elliptic curve which is generally used.

There is also known a high-speed addition and doubling calculation method for an elliptic curve defined on a finite field of characteristic 2. If such a calculation method is used for addition and doubling calculation in the above-mentioned procedure, scalar multiplication calculation can be carried out at a higher speed than general scalar multiplication calculation for an elliptic curve defined on a finite field of characteristic 2.

Figure 4:
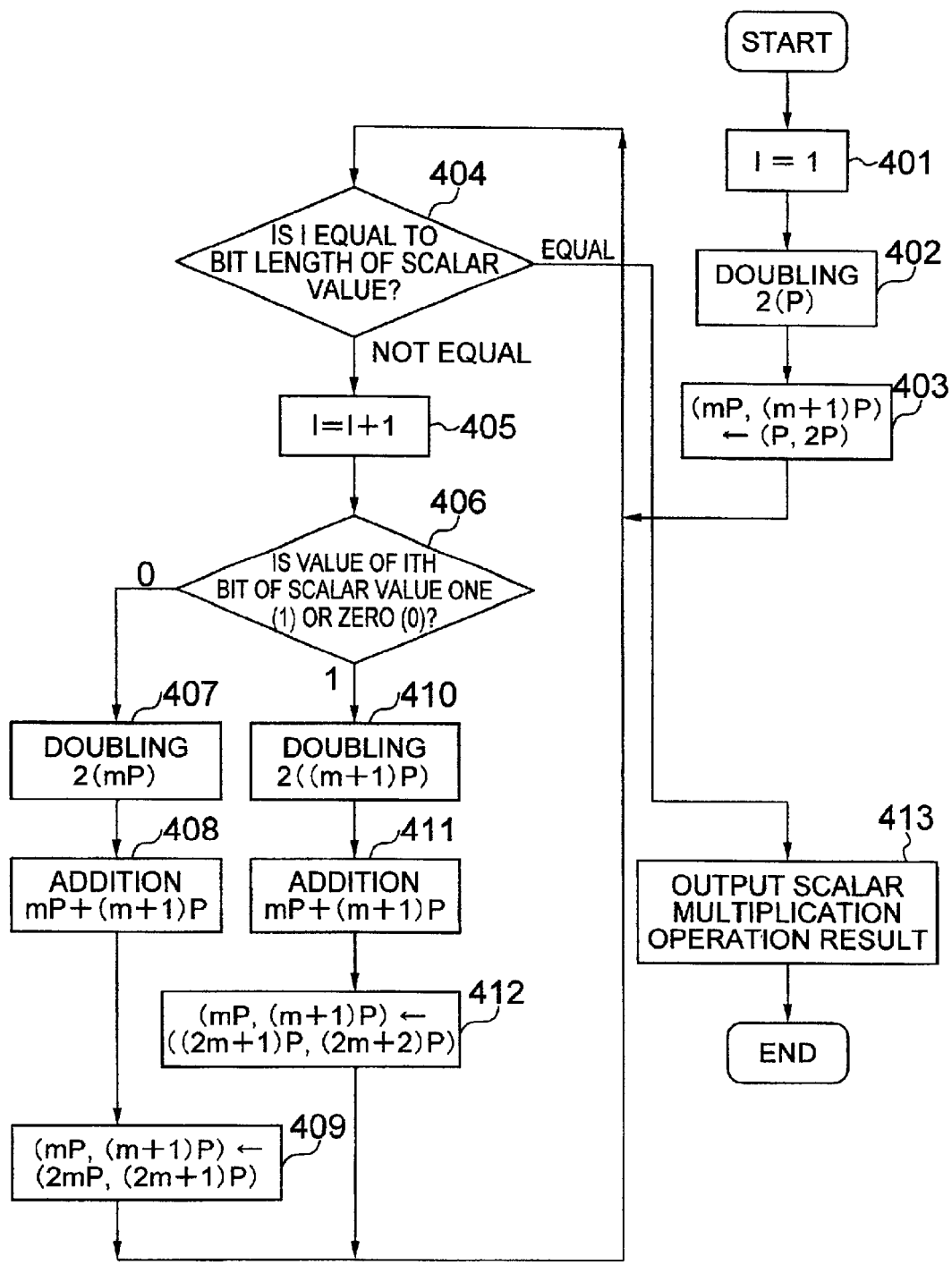
FIG. 4 is a flow chart showing a scalar multiplication calculation method according to a second embodiment of the present invention.
Figure 5:
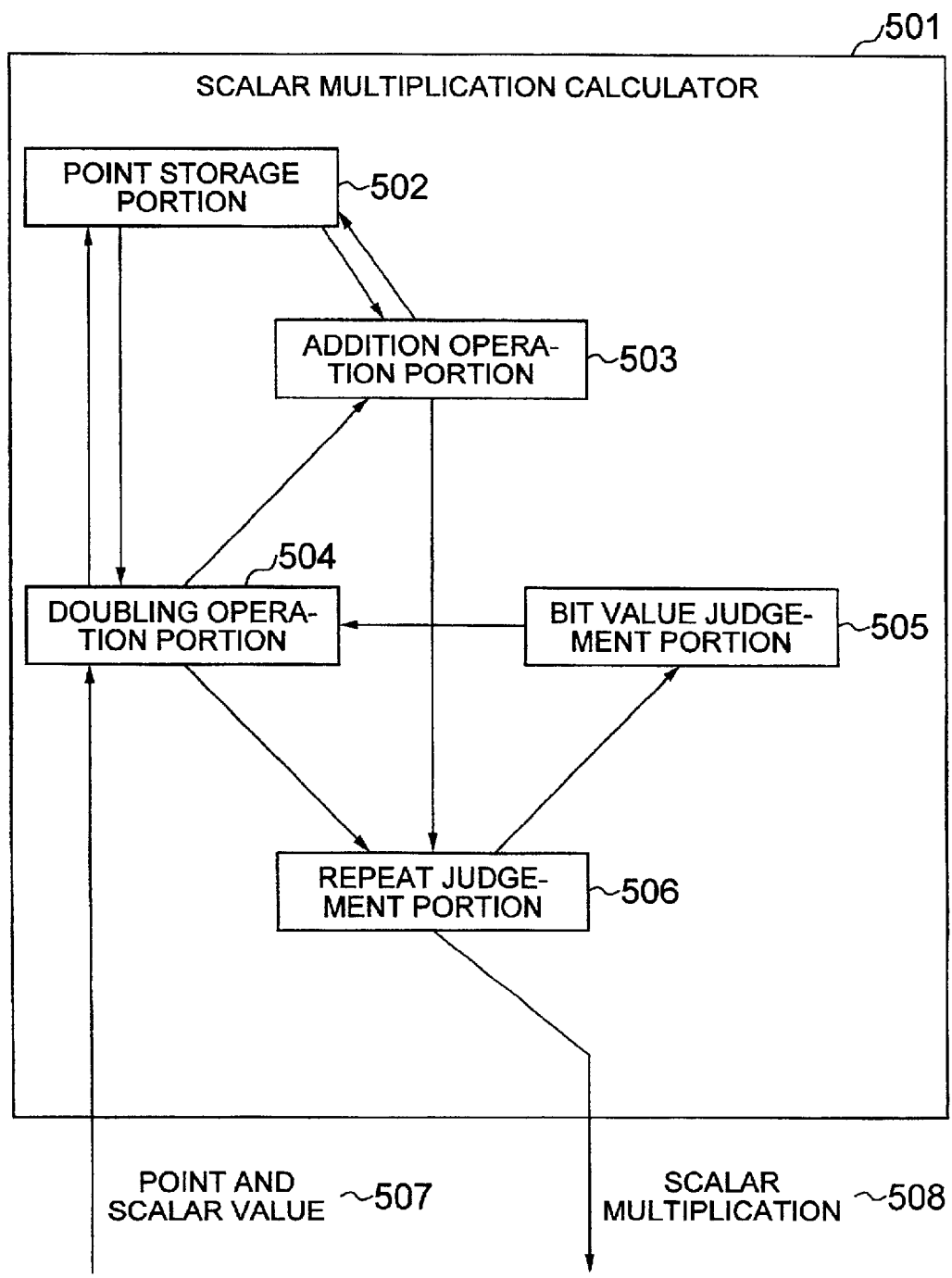
FIG. 5 is a view showing a flow of processing in the scalar multiplication calculation method and an apparatus therefor according to the second embodiment.

FIG. 5 is a view showing a second embodiment of a scalar multiplication calculation method in which secret information does not leak out even if cryptographic processing process leaks out in cryptographic processing in which the secret information is used in the cryptographic processing system 1101 in FIG. 11. FIG. 4 is a flow chart showing the scalar multiplication calculation method according to the second embodiment. The second embodiment will be described with reference to FIGS. 4 and 5.

In a scalar multiplication calculator 501, a point and a scalar value 507 are inputted, and a scalar multiplication 508 is outputted in the following procedure. In Step 401, 1 is substituted for a variable I as its initial value in order to make judgement in a repeat judgement portion 506 as to whether repeat should be done or not. In Step 402, a double point 2P of the point P is calculated by a doubling operation portion 504. In Step 403, the point P supplied to the scalar multiplication calculator 501 and the point 2P obtained in Step 402 are stored in a point storage portion 502 as a point pair (P, 2P). In Step 404, judgement is made by the repeat judgement portion 506 as to whether the variable I and bit length of the scalar value are coincident with each other or not. If both the variable I and the scalar value are coincident with each other, the processing goes to Step 413. If not, the processing goes to Step 405. In Step 405, the variable I is increased by 1. In Step 406, judgement is made by a bit value judgement portion 505 as to whether the value of the $I^{th}$ bit of the scalar value is 0 or 1. If the value of the $I^{th}$ bit is 0, the processing goes to Step 407. If the value of the $I^{th}$ bit is 1, the processing goes to Step 410.

In Step 407, by the doubling operation portion 504, doubling 2(mP) of the point mP is carried out on the basis of a point pair (mP, (m+1)P) stored in the point storage portion 502. Thus, a point 2mP is calculated. Then, the processing goes to Step 408. In Step 408, by an addition operation portion 503, addition mP+(m+1)P between the point mP and the point (m+1)P is carried out on the basis of the point pair (mP, (m+1)P) stored in the point storage portion 502. Thus, a point (2m+1)P is calculated. Then, the processing goes to Step 409. In Step 409, the point 2mP obtained in Step 407 and the point (2m+1)P obtained in Step 408 are stored in the point storage portion 502 as a point pair (2mP, (2m+1)P) in place of the point pair (mP, (m+1)P). Then, the processing returns to Step 404.

In Step 410, by the doubling operation portion 504, doubling 2((m+1)P) of the point (m+1)P is carried out on the basis of a point pair (mP, (m+1)P) stored in the point storage portion 502. Thus, a point (2m+2)P is calculated. Then, the processing goes to Step 411. In Step 411, by an addition operation portion 503, addition mP+(m+1)P between the point mP and a point (m+1)P is carried out on the basis of the point pair (mP, (m+1)P) stored in the point storage portion 502. Thus, a point (2m+1)P is calculated. Then, the processing goes to Step 412. In Step 412, the point (2m+1)P obtained in Step 411 and the point (2m+2)P obtained in Step 410 are stored in the point storage portion 502 as a point pair ((2m+1)P, (2m+2)P) in place of the point pair (mP, (m+1)P). Then, the processing returns to Step 404.

In Step 413, the point mP is outputted as the scalar multiplication 508 on the basis of the point pair (mP, (m+1)P) stored in the point storage portion 502. Thus, the processing is terminated.

In the same manner as that in the first embodiment, it can be proved that the point mP which is a value outputted in the above-mentioned procedure is in keeping with the scalar multiplied point dP obtained by multiplying the point P by the scalar value $\underline{d}$.

On the other hand, the reason why information about any scalar value as secret information does not leak out even if scalar multiplication calculation process leaks out in the above-mentioned procedure is just as follows. If it is proved that two scalar values different only in a specific bit from each other are subjected to the same calculation process, it is proved that information about any scalar value as secret information does not leak out even if scalar multiplication calculation process leaks out because the other portions are proved by the same reason as that in the first embodiment.

Therefore, consideration will be made about two scalar values different only in a specific bit from each other. The difference of value in the specific bit makes a difference as to whether the procession goes to Step 407 or to Step 410 after the judgement of bit values in Step 406 after operations are repeated a specific number of times in the calculation process. However, whichever the processing goes to Step 407 or to Step 410, the same steps are taken thereafter. That is, after Step 407 and Step 410, doubling is first carried out, addition is next carried out, and then the result is stored as a point pair. Then, the processing returns to Step 404. Accordingly, there is no difference in calculation process. Therefore, it is impossible to take out information of any scalar value from the scalar multiplication calculation process.

In addition, when a Montgomery-form elliptic curve is used as the elliptic curve, scalar multiplication calculation can be carried out at a higher speed than Weierstrass-form elliptic curve in the same manner as that in the first embodiment.

Also with respect to an elliptic curve defined on a finite field of characteristic 2, if a high-speed addition and doubling calculation method is used for addition and doubling calculation in the above-mentioned procedure, scalar multiplication calculation can be carried out at a higher speed than general scalar multiplication calculation for an elliptic curve defined on a finite field of characteristic 2, in the same manner as that in the first embodiment.

Figure 6:
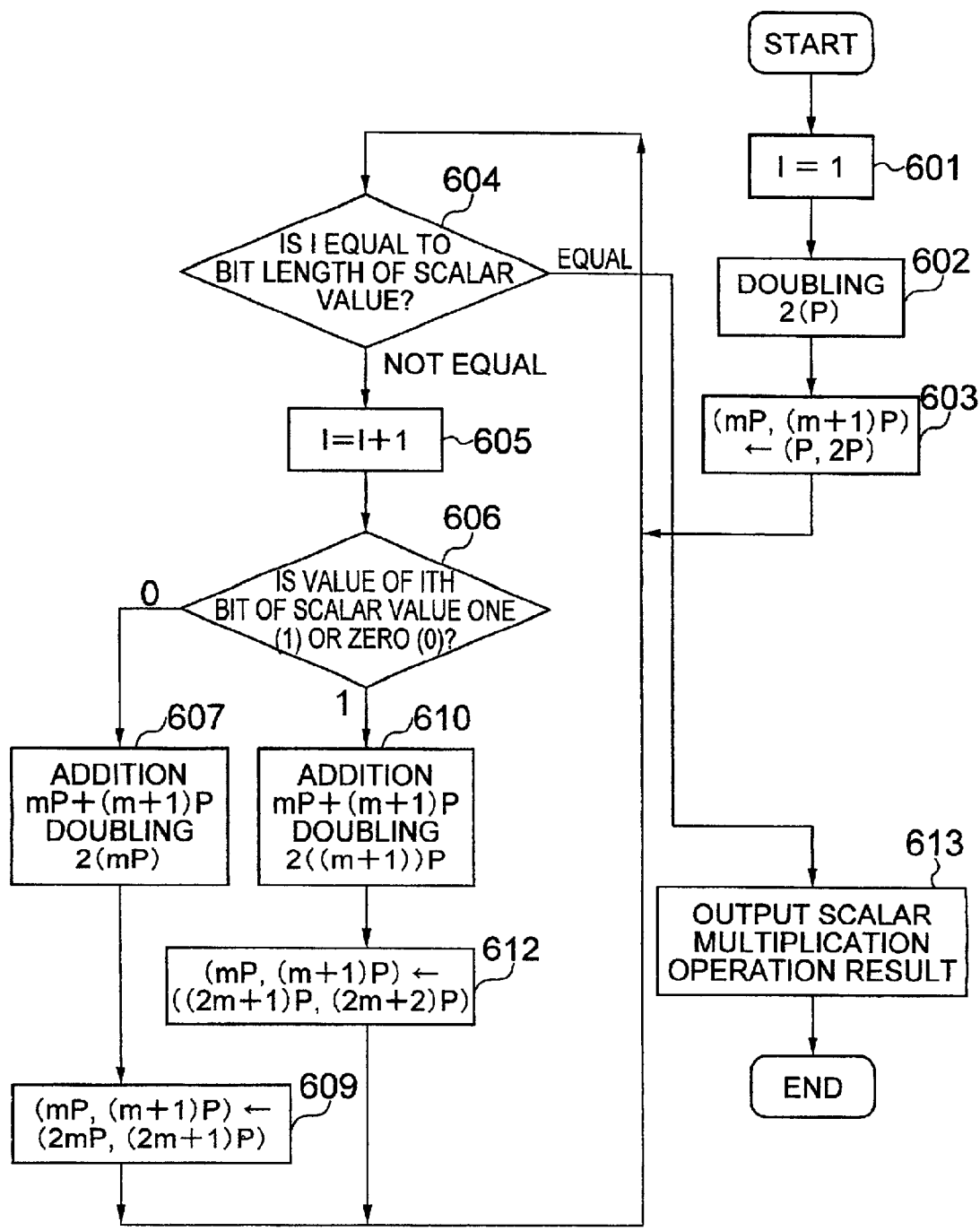
FIG. 6 is a flow chart showing a flow of processing in the scalar multiplication calculation method according to the third embodiment.
Figure 7:
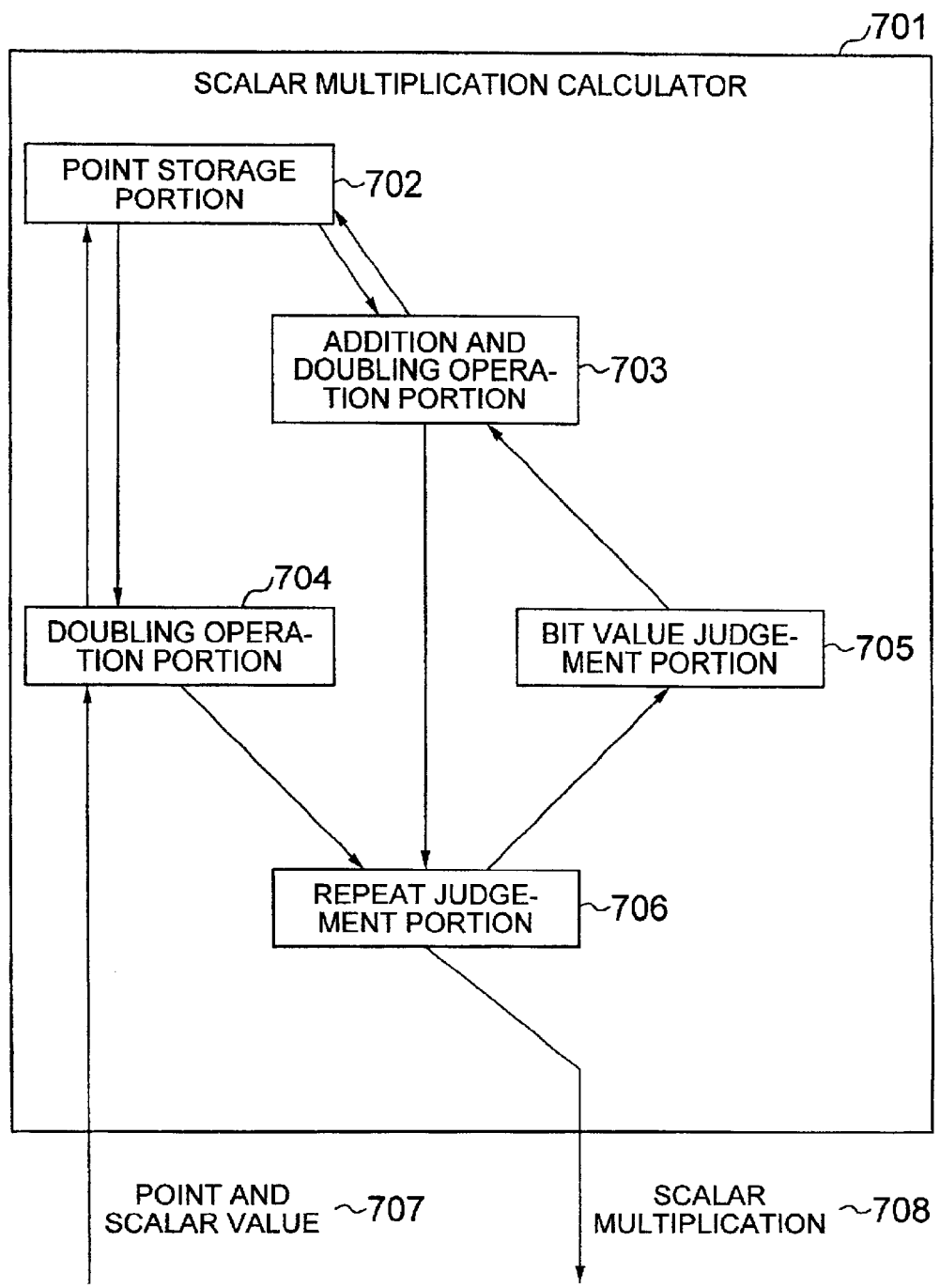
FIG. 7 is a view showing a flow of processing in the scalar multiplication calculation method and an apparatus therefor according to the third embodiment.

FIG. 7 is a view showing a third embodiment of a scalar multiplication calculation method in which secret information does not leak out even if cryptographic processing process leaks out in cryptographic processing in which the secret information is used in the cryptographic processing system 1101 in FIG. 11. FIG. 6 is a flow chart showing the scalar multiplication calculation method according to the third embodiment. The third embodiment will be described with reference to FIGS. 6 and 7.

In a scalar multiplication calculator 701, a point and a scalar value 707 are inputted, and a scalar multiplication 708 is outputted in the following procedure. In Step 601, 1 is substituted for a variable I as its initial value in order to make judgement in a repeat judgement portion 706 as to whether repeat should be done or not. In Step 602, a double point 2P of the point P is calculated by a doubling operation portion 704. In Step 603, the point P supplied to the scalar multiplication calculator 701 and the point 2P obtained in Step 602 are stored in a point storage portion 702 as a point pair (P, 2P). In Step 604, judgement is made by the repeat judgement portion 706 as to whether the variable I and bit length of the scalar value are coincident with each other or not. If both the variable I and the scalar value are coincident with each other, the processing goes to Step 613. If not, the processing goes to Step 605. In Step 605, the variable I is increased by 1. In Step 606, judgement is made by a bit value judgement portion 705 as to whether the value of the $I^{th}$ bit of the scalar value is 0 or 1. If the value of the $I^{th}$ bit is 0, the processing goes to Step 607. If the value of the $I^{th}$ bit is 1, the processing goes to Step 610.

In Step 607, in an addition and doubling operation portion 703, addition mP+(m+1)P between a point mP and a point (m+1)P and doubling 2(mP) of the point mP are carried out simultaneously on the basis of a point pair (mP, (m+1)P) stored in the point storage portion 702. Thus, a point (2m+1)P and a point 2mP are calculated. Then, the processing goes to Step 609. In Step 609, the point 2mP and the point (2m+1)P obtained in Step 607 are stored in the point storage portion 702 as a point pair (2mP, (2m+1)P) in place of the point pair (mP, (m+1)P). Then, the processing returns to Step 604.

In Step 610, in an addition and doubling operation portion 703, addition mP+(m+1)P between a point mP and a point (m+1)P and doubling 2((m+1)P) of the point (m+1)P are carried out simultaneously on the basis of a point pair (mP, (m+1)P) stored in the point storage portion 702. Thus, a point (2m+1)P and a point (2m+2)P are calculated. Then, the processing goes to Step 612. In Step 612, the point (2m+1)P and the point (2m+2)P obtained in Step 610 are stored in the point storage portion 702 as a point pair ((2m+1)P, (2m+2)P) in place of the point pair (mP, (m+1)P). Then, the processing returns to Step 604.

In Step 613, the point mP is outputted as the scalar multiplication 708 on the basis of the point pair (mP, (m+1)P) stored in the point storage portion 702. Thus, the processing is terminated.

In the same manner as that in the first embodiment, it can be proved that the point mP which is a value outputted in the above-mentioned procedure is in keeping with the scalar multiplied point dP obtained by multiplying the point P by the scalar value d.

On the other hand, the reason why information about any scalar value as secret information does not leak out even if scalar multiplication calculation process leaks out in the above-mentioned procedure is just as follows. If it is proved that two scalar values different only in a specific bit from each other are subjected to the same calculation process, it is proved that information about any scalar value as secret information does not leak out even if scalar multiplication calculation process leaks out because the other portions are proved by the same reason as that in the first embodiment. Therefore, consideration will be made about two scalar values different only in a specific bit from each other. The difference of value in the specific bit makes a difference as to whether the procession goes to Step 607 or to Step 610 after the judgement of bit values in Step 606 after operations are repeated a specific number of times in the calculation process. However, whichever the processing goes to Step 607 or to Step 610, the same steps are taken thereafter. That is, after Step 607 and Step 610, addition and doubling are carried out simultaneously, and then the result is stored as a point pair. Then, the processing returns to Step 604. Accordingly, there is no difference in calculation process. Therefore, it is impossible to take out information of any scalar value from the scalar multiplication calculation process.

In addition, when a Montgomery-form elliptic curve is used as the elliptic curve, scalar multiplication calculation can be carried out at a higher speed than Weierstrass-form elliptic curve in the same manner as that in the first embodiment.

Also with respect to an elliptic curve defined on a finite field of characteristic 2, if a high-speed addition and doubling calculation method is used for addition and doubling calculation in the above-mentioned procedure, scalar multiplication calculation can be carried out at a higher speed than general scalar multiplication calculation for an elliptic curve defined on a finite field of characteristic 2, in the same manner as that in the first embodiment.

Figure 8:
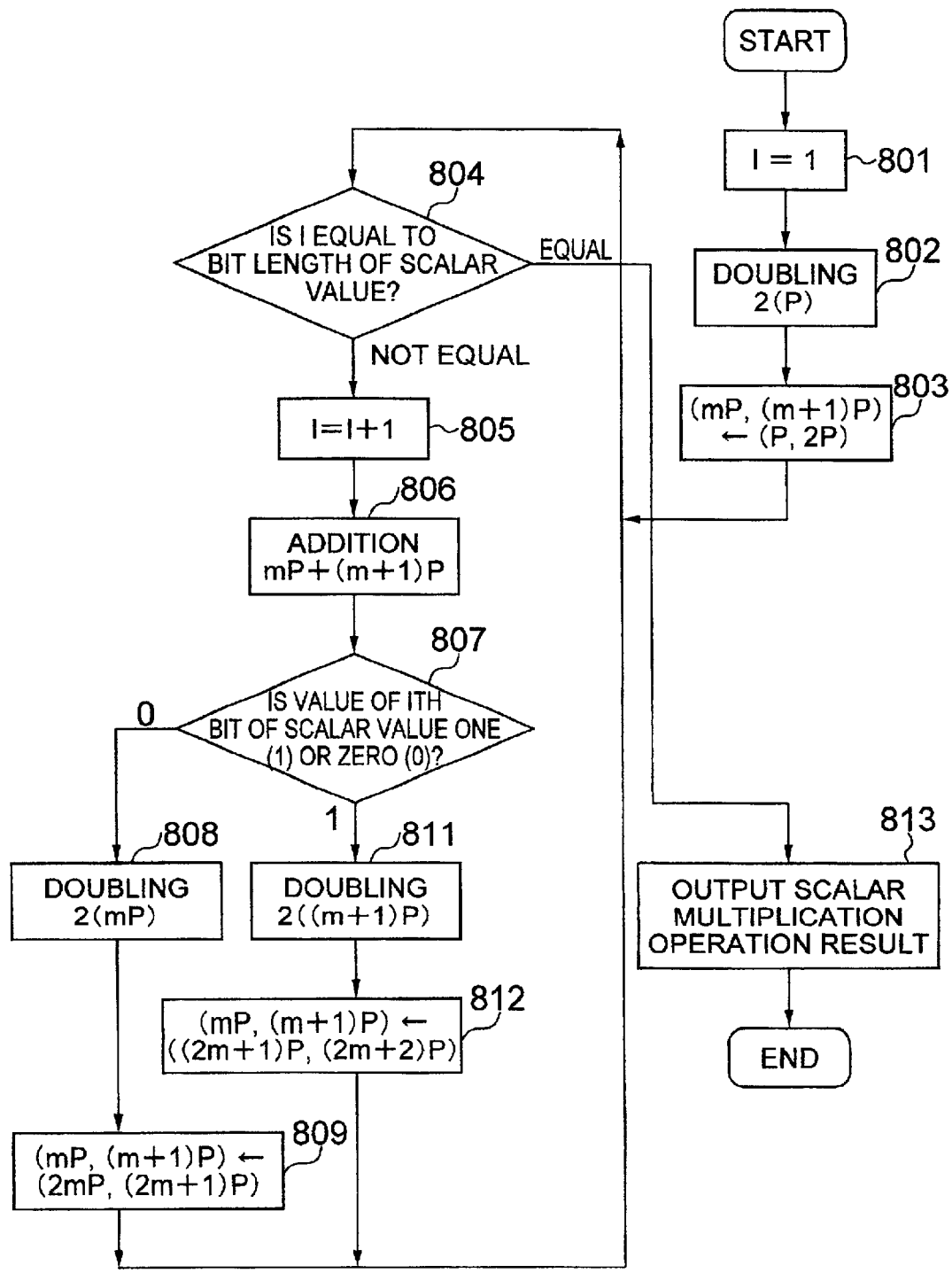
FIG. 8 is a flow chart showing a scalar multiplication calculation method according to a fourth embodiment of the present invention.
Figure 9:
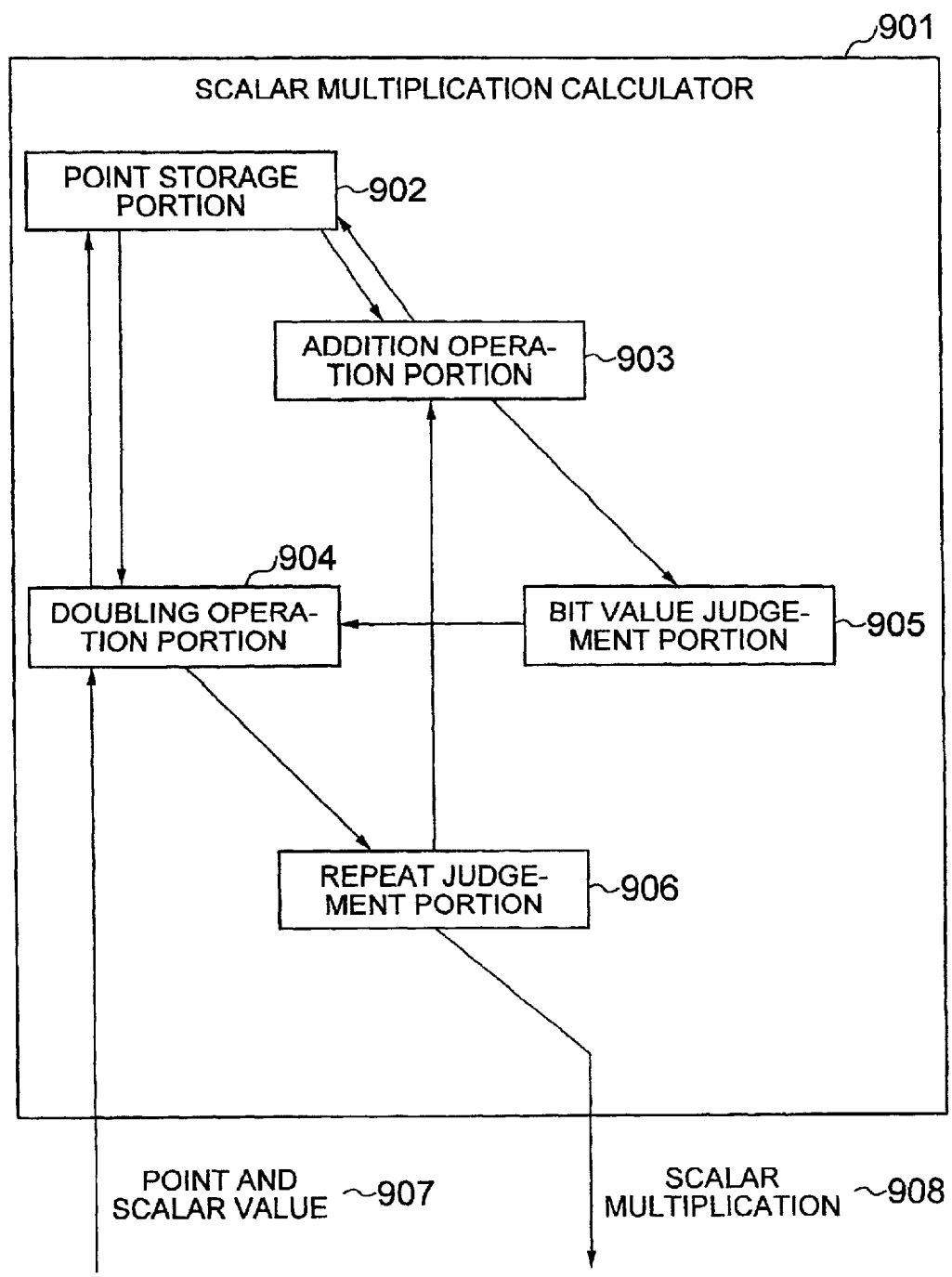
FIG. 9 is a view showing a flow of processing in the scalar multiplication calculation method and an apparatus therefor according to the fourth embodiment.

FIG. 9 is a view showing a fourth embodiment of a scalar multiplication calculation method in which a secret information does not leak out even if cryptographic processing process leaks out in cryptographic processing in which the secret information is used in the cryptographic processing system 1101 in FIG. 11. FIG. 8 is a flow chart showing the scalar multiplication calculation method according to the fourth embodiment. The fourth embodiment will be described with reference to FIGS. 8 and 9.

In a scalar multiplication calculator 901, a point and a scalar value 907 are inputted, and a scalar multiplication 908 is outputted in the following procedure. In Step 801, 1 is substituted for a variable I as its initial value in order to make judgement in a repeat judgement portion 906 as to whether repeat should be done or not. In Step 802, a double point 2P of the point P is calculated in a doubling operation portion 904. In Step 803, the point P supplied to the scalar multiplication calculator 901 and the point 2P obtained in Step 802 are stored in a point storage portion 902 as a point pair (P, 2P). In Step 804, judgement is made by the repeat judgement portion 906 as to whether the variable I and bit length of the scalar value are coincident with each other or not. If both the variable I and the scalar value are coincident with each other, the processing goes to Step 813. If not, the processing goes to Step 805. In Step 805, the variable I is increased by 1. In Step 806, by an addition operation portion 903, addition mP+(m+1)P between a point mP and a point (m+1)P is carried out on the basis of a point pair (mP, (m+1)P) stored in the point storage portion 902. Thus, a point (2m+1)P is calculated. In Step 807, judgement is made by a bit value judgement portion 905 as to whether the value of the $I^{th}$ bit of the scalar value is 0 or 1. If the value of the $I^{th}$ bit is 0, the processing goes to Step 808. If the value of the $I^{th}$ bit is 1, the processing goes to Step 811.

In Step 808, by the doubling operation portion 904, doubling 2(mP) of the point mP is carried out on the basis of the point pair (mP, (m+1)P) stored in the point storage portion 902. Thus, a point 2mP is calculated. Then, the processing goes to Step 809. In Step 809, the point 2mP obtained in Step 808 and the point (2m+1)P obtained in Step 806 are stored in the point storage portion 902 as a point pair (2mP, (2m+1)P) in place of the point pair (mP, (m+1)P). Then, the processing returns to Step 804. In Step 811, by the doubling operation portion 904, doubling 2((m+1)P) of the point (m+1)P is carried out on the basis of the point pair (mP, (m+1)P) stored in the point storage portion 902. Thus, a point (2m+2)P is calculated. Then, the processing goes to Step 812. In Step 812, the point (2m+1)P obtained in Step 806 and the point (2m+2)P obtained in Step 811 are stored in the point storage portion 902 as a point pair ((2m+1)P, (2m+2)P) in place of the point pair (mP, (m+1)P). Then, the processing returns to Step 804.

In Step 813, the point mP is outputted as the scalar multiplication 908 on the basis of the point pair (mP, (m+1)P) stored in the point storage portion 902. Thus, the processing is terminated.

In the same manner as that in the first embodiment, it can be proved that the point mP which is a value outputted in the above-mentioned procedure is in keeping with the scalar multiplied point dP obtained by multiplying the point P by the scalar value d.

On the other hand, the reason why information about any scalar value as secret information does not leak out even if scalar multiplication calculation process leaks out in the above-mentioned procedure is just as follows. If it is proved that two scalar values different only in a specific bit from each other are subjected to the same calculation process, it is proved that information about any scalar value as secret information does not leak out even if scalar multiplication calculation process leaks out because the other portions are proved by the same reason as that in the first embodiment.

Therefore, consideration will be made about two scalar values different only in a specific bit from each other. The difference of value in the specific bit makes a difference as to whether the procession goes to Step 808 or to Step 811 after the judgement of bit values in Step 807 after operations are repeated a specific number of times in the calculation process. However, whichever the processing goes to Step 808 or to Step 811, the same steps are taken thereafter. That is, after Step 808 and after Step 811, doubling is carried out, and then the result is stored together with the result of addition as a point pair. Then, the processing returns to Step 804. Accordingly, there is no difference in calculation process. Therefore, it is impossible to take out information of any scalar value from the scalar multiplication calculation process.

In addition, when a Montgomery-form elliptic curve is used as the elliptic curve, scalar multiplication calculation can be carried out at a higher speed than Weierstrass-form elliptic curve in the same manner as that in the first embodiment.

Also with respect to an elliptic curve defined on a finite field of characteristic 2, if a high-speed addition and doubling calculation method is used for addition and doubling calculation in the above-mentioned procedure, scalar multiplication calculation can be carried out at a higher speed than general scalar multiplication calculation for an elliptic curve defined on a finite field of characteristic 2, in the same manner as that in the first embodiment.

Figure 12:
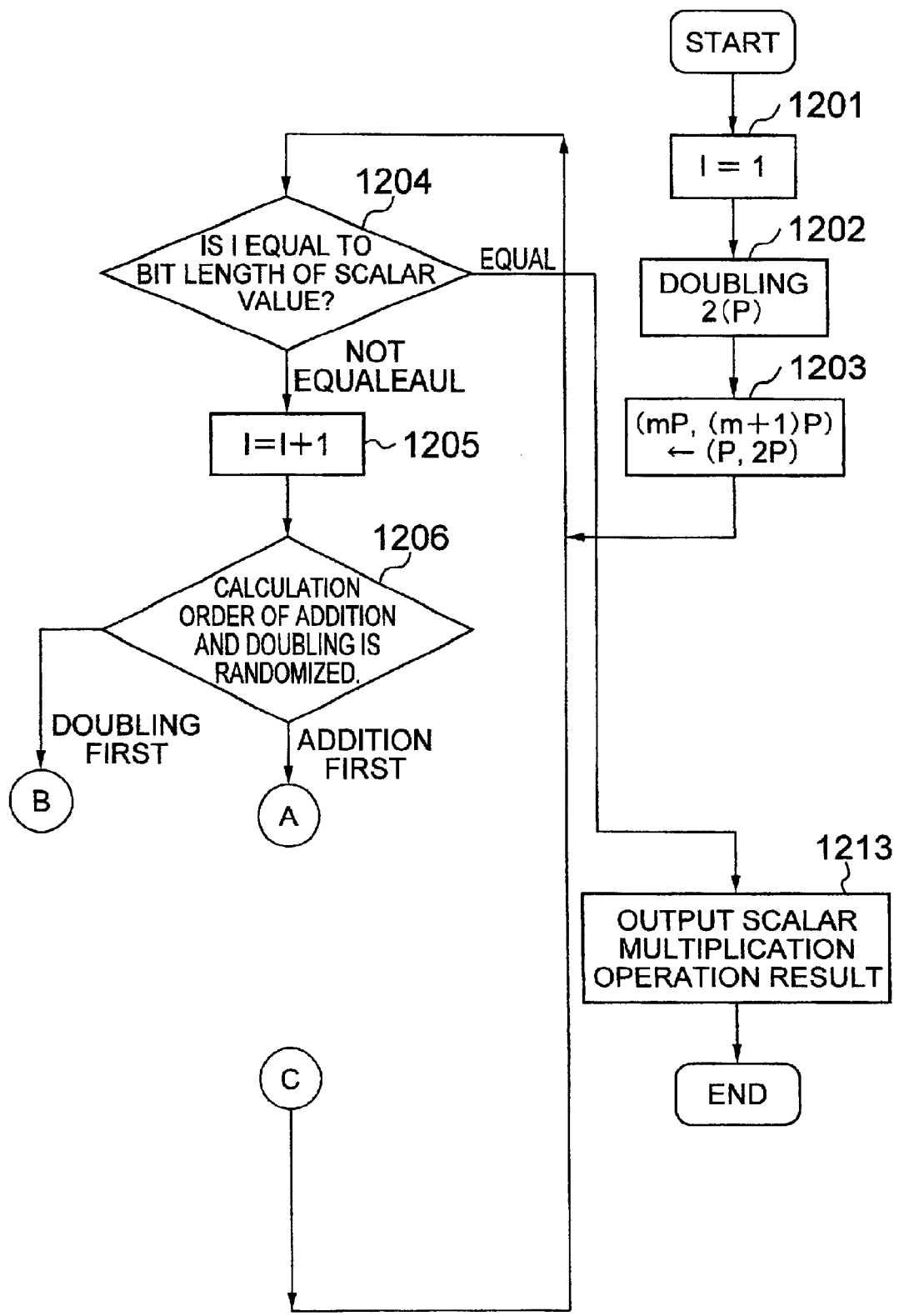
FIG. 12 is a flow chart showing a scalar multiplication calculation method according to a fifth embodiment of the present invention.
Figure 13:
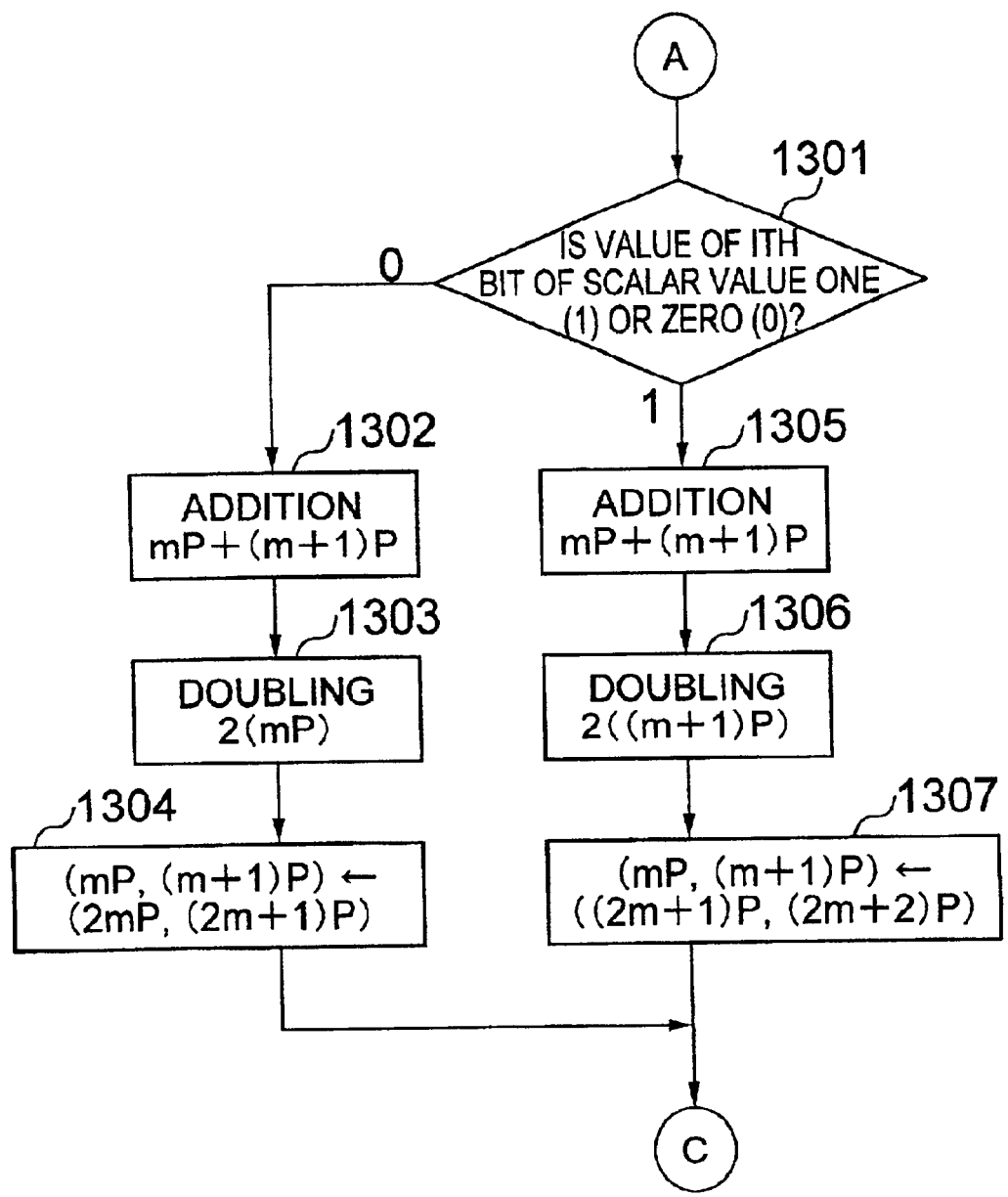
FIG. 13 is a flow chart showing the scalar multiplication calculation method according to the fifth embodiment of the present invention.
Figure 14:
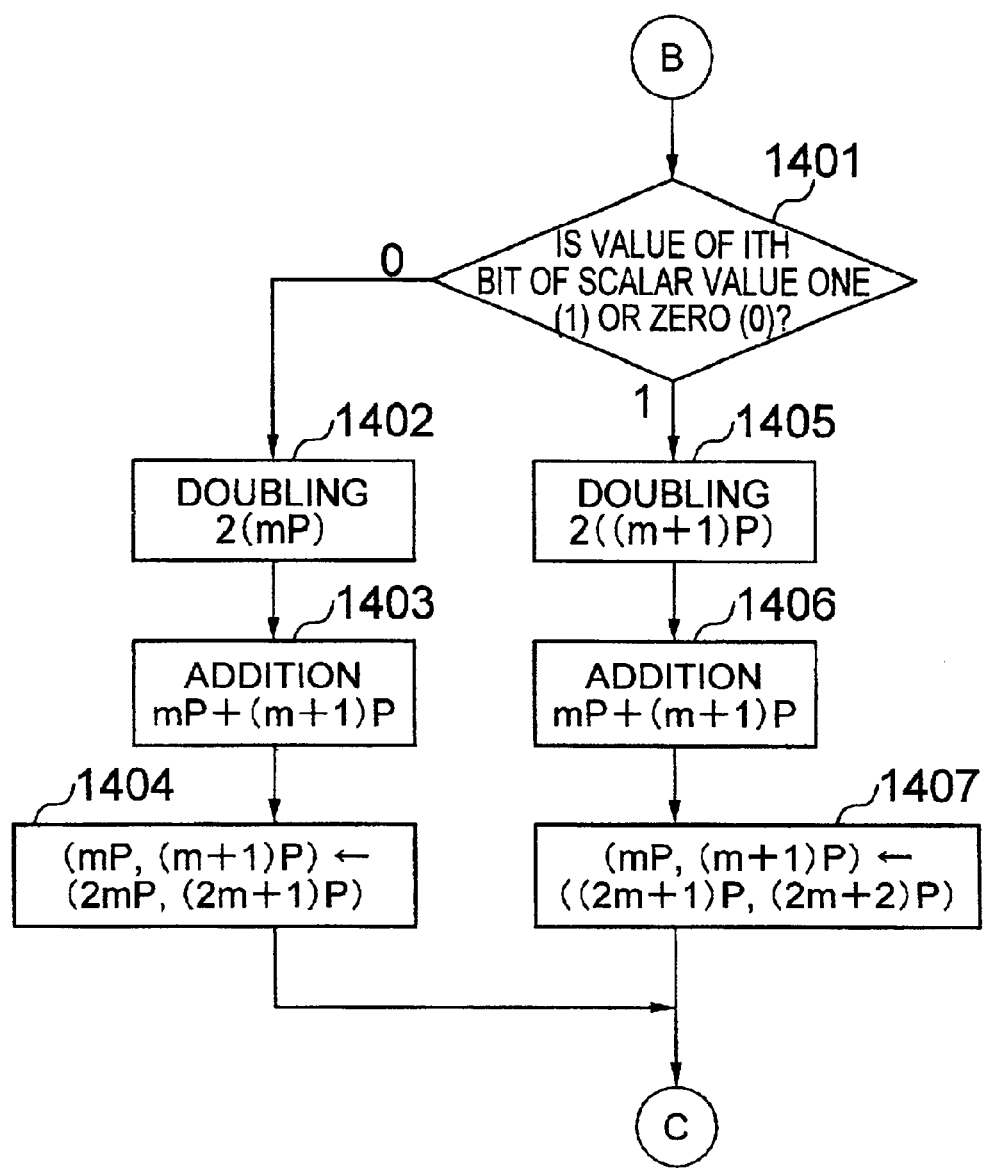
FIG. 14 is a flow chart showing the scalar multiplication calculation method according to the fifth embodiment of the present invention.
Figure 15:
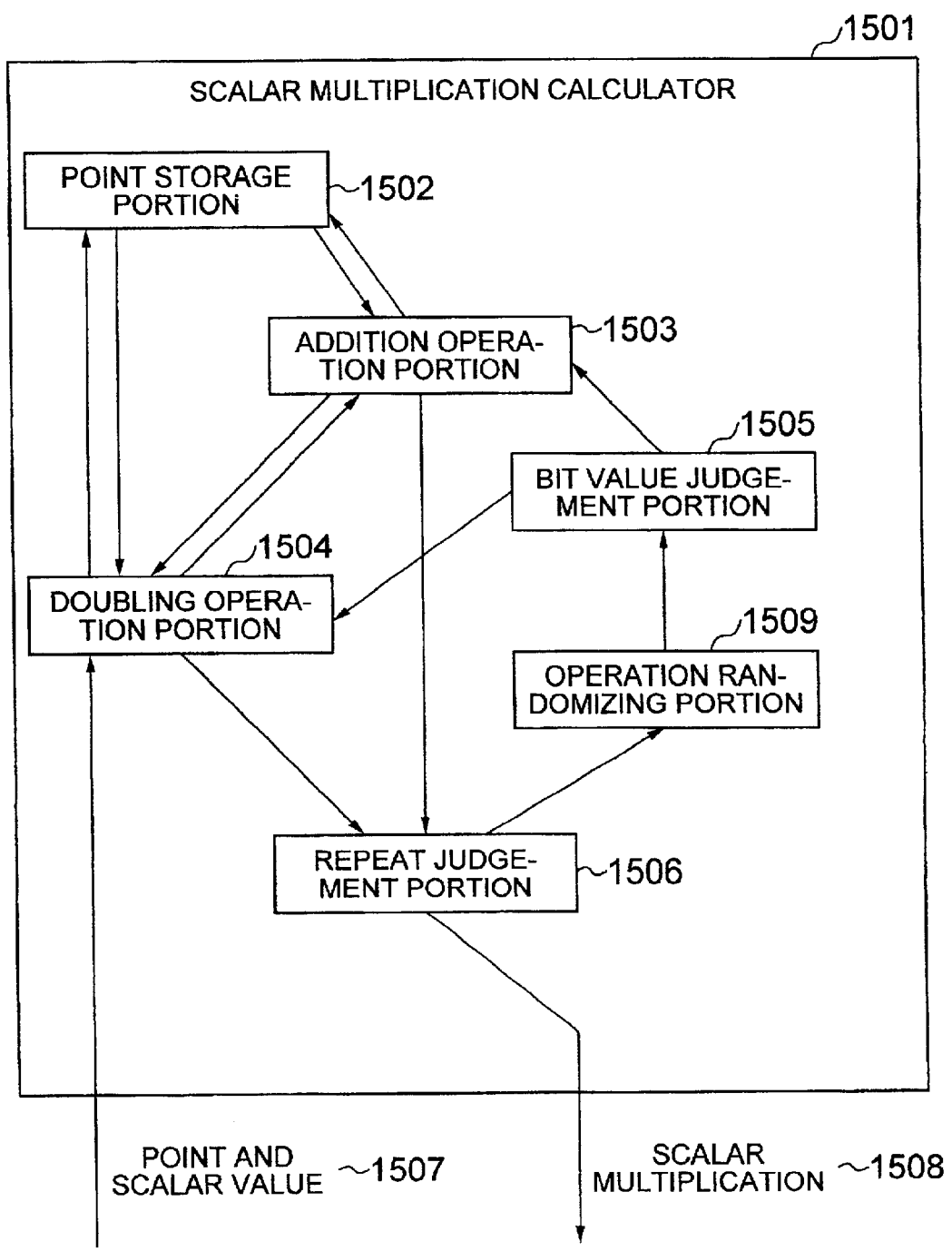
FIG. 15 is a view showing a flow of processing in the scalar multiplication calculation method and an apparatus therefor according to the fifth embodiment.

FIG. 15 is a view showing a fifth embodiment of a scalar multiplication calculation method in which secret information does not leak out even if cryptographic processing process leaks out in cryptographic processing in which the secret information is used in the cryptographic processing system 1101 in FIG. 11. FIGS. 12 to 14 are a flow chart showing the scalar multiplication calculation method according to the fifth embodiment. The fifth embodiment will be described with reference to FIGS. 12 to 15.

In a scalar multiplication calculator 1501, a point and a scalar value 1507 are inputted, and a scalar multiplication 1508 is outputted in the following procedure. In Step 1201, 1 is substituted for a variable I as its initial value in order to make judgement in a repeat judgement portion 1506 as to whether repeat should be done or not. In Step 1202, a double point 2P of the point P is calculated by a doubling operation portion 1504. In Step 1203, the point P supplied to the scalar multiplication calculator 1501 and the point 2P obtained in Step 1202 are stored in a point storage portion 1502 as a point pair (P, 2P). In Step 1204, judgement is made by the repeat judgement portion 1506 as to whether the variable I and bit length of the scalar value are coincident with each other or not. If both the variable I and the scalar value are coincident with each other, the processing goes to Step 1213. If not, the processing goes to Step 1205. In Step 1205, the variable I is increased by 1. In Step 1206, the calculation order of addition and doubling is randomized by an operation randomizing portion 1509. To carry out the calculation in the order of addition and then doubling, the processing goes to Step 1301. To carry out the calculation in the order of doubling and then addition, the processing goes to Step 1401.

In Step 1301, judgement is made by a bit value judgement portion 1505 as to whether the value of the $I^{th}$ bit of the scalar value is 0 or 1. If the value of the $I^{th}$ bit is 0, the processing goes to Step 1302. If the value of the $I^{th}$ bit is 1, the processing goes to Step 1305.

In Step 1302, by an addition operation portion 1503, addition mP+(m+1)P between a point mP and a point (m+1)P is carried out on the basis of a point pair (mP, (m+1)P) stored in the point storage portion 1502. Thus, a point (2m+1)P is calculated. Then, the processing goes to Step 1303. In Step 1303, by the doubling operation portion 1504, doubling 2(mP) of the point mP is carried out on the basis of the point pair (mP, (m+1)P) stored in the point storage portion 1502. Thus, a point 2mP is calculated. Then, the processing goes to Step 1304. In Step 1304, the point 2mP obtained in Step 1303 and the point (2m+1)P obtained in Step 1302 are stored in the point storage portion 1502 as a point pair (2mP, (2m+1)P) in place of the point pair (mP, (m+1)P). Then, the processing returns to Step 1204.

In Step 1305, by an addition operation portion 1503, addition mP+(m+1)P between a point mP and a point (m+1)P is carried out on the basis of a point pair (mP, (m+1)P) stored in the point storage portion 1502. Thus, a point (2m+1)P is calculated. Then, the processing goes to Step 1306. In Step 1306, by the doubling operation portion 1504, doubling 2((m+1)P) of the point (m+1)P is carried out on the basis of the point pair (mP, (m+1)P) stored in the point storage portion 1502. Thus, a point (2m+2)P is calculated. Then, the processing goes to Step 1307. In Step 1307, the point (2m+1)P obtained in Step 1305 and the point (2m+2)P obtained in Step 1306 are stored in the point storage portion 1502 as a point pair ((2m+1)P, (2m+2)P) in place of the point pair (mP, (m+1)P). Then, the processing returns to Step 1204.

In Step 1401, judgement is made by a bit value judgement portion 1505 as to whether the value of the $I^{th}$ bit of the scalar value is 0 or 1. If the value of the $I^{th}$ bit is 0, the processing goes to Step 1402. If the value of the $I^{th}$ bit is 1, the processing goes to Step 1405.

In Step 1402, by the doubling operation portion 1504, doubling 2(mP) of the point mP is carried out on the basis of a point pair (mP, (m+1)P) stored in the point storage portion 1502. Thus, a point 2(mP) is calculated. Then, the processing goes to Step 1403. In Step 1403, by the addition operation portion 1503, addition mP+(m+1)P between the point mP and the point (m+1)P is carried out on the basis of the point pair (mP, (m+1)P) stored in the point storage portion 1502. Thus, a point (2m+1)P is calculated. Then, the processing goes to Step 1404. In Step 1404, the point 2mP obtained in Step 1402 and the point (2m+1)P obtained in Step 1403 are stored in the point storage portion 1502 as a point pair (2mP, (2m+1)P) in place of the point pair (mP, (m+1)P). Then, the processing returns to Step 1204.

In Step 1405, by the doubling operation portion 1504, doubling 2((m+1)P) of the point (m+1)P is carried out on the basis of a point pair (mP, (m+1)P) stored in the point storage portion 1502. Thus, a point (2m+2)P is calculated. Then, the processing goes to Step 1406. In Step 1406, by the addition operation portion 1503, addition mP+(m+1)P between the point mP and the point (m+1)P is carried out on the basis of the point pair (mP, (m+1)P) stored in the point storage portion 1502. Thus, a point (2m+1)P is calculated. Then, the processing goes to Step 1407. In Step 1407, the point (2m+1)P obtained in Step 1406 and the point (2m+2)P obtained in Step 1405 are stored in the point storage portion 1502 as a point pair ((2m+1)P, (2m+2)P) in place of the point pair (mP, (m+1)P). Then, the processing returns to Step 1204.

In Step 1213, the point mP is outputted as the scalar multiplication 1508 on the basis of the point pair (mP, (m+1)P) stored in the point storage portion 1502. Thus, the processing is terminated.

In the same manner as that in the first embodiment, it can be proved that the point mP which is a value outputted in the above-mentioned procedure is in keeping with the scalar multiplied point dP obtained by multiplying the point P by the scalar value d.

In addition, if a Montgomery-form elliptic curve is used as the elliptic curve, addition and doubling can be carried out at a high speed. Thus, scalar multiplication calculation can be carried out at a higher speed than in a Weierstrass-form elliptic curve which is generally used.

Also with respect to an elliptic curve defined on a finite field of characteristic 2, if a high-speed addition and doubling calculation method is used for addition and doubling calculation in the above-mentioned procedure, scalar multiplication calculation can be carried out at a higher speed than general scalar multiplication calculation for an elliptic curve defined on a finite field of characteristic 2.

Figure 22:
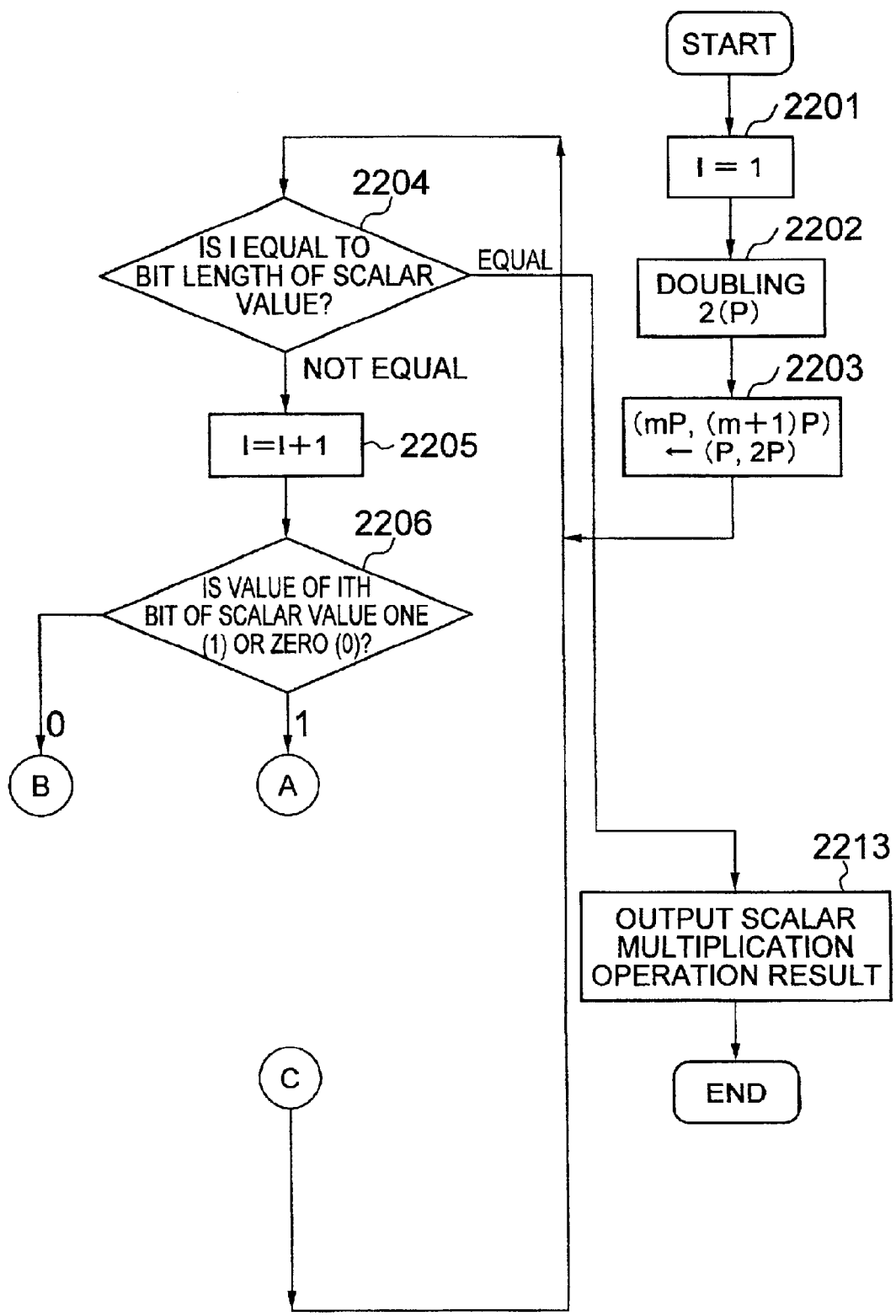
FIG. 22 a flow chart showing a scalar multiplication calculation method according to a sixth embodiment of the present invention.
Figure 23:
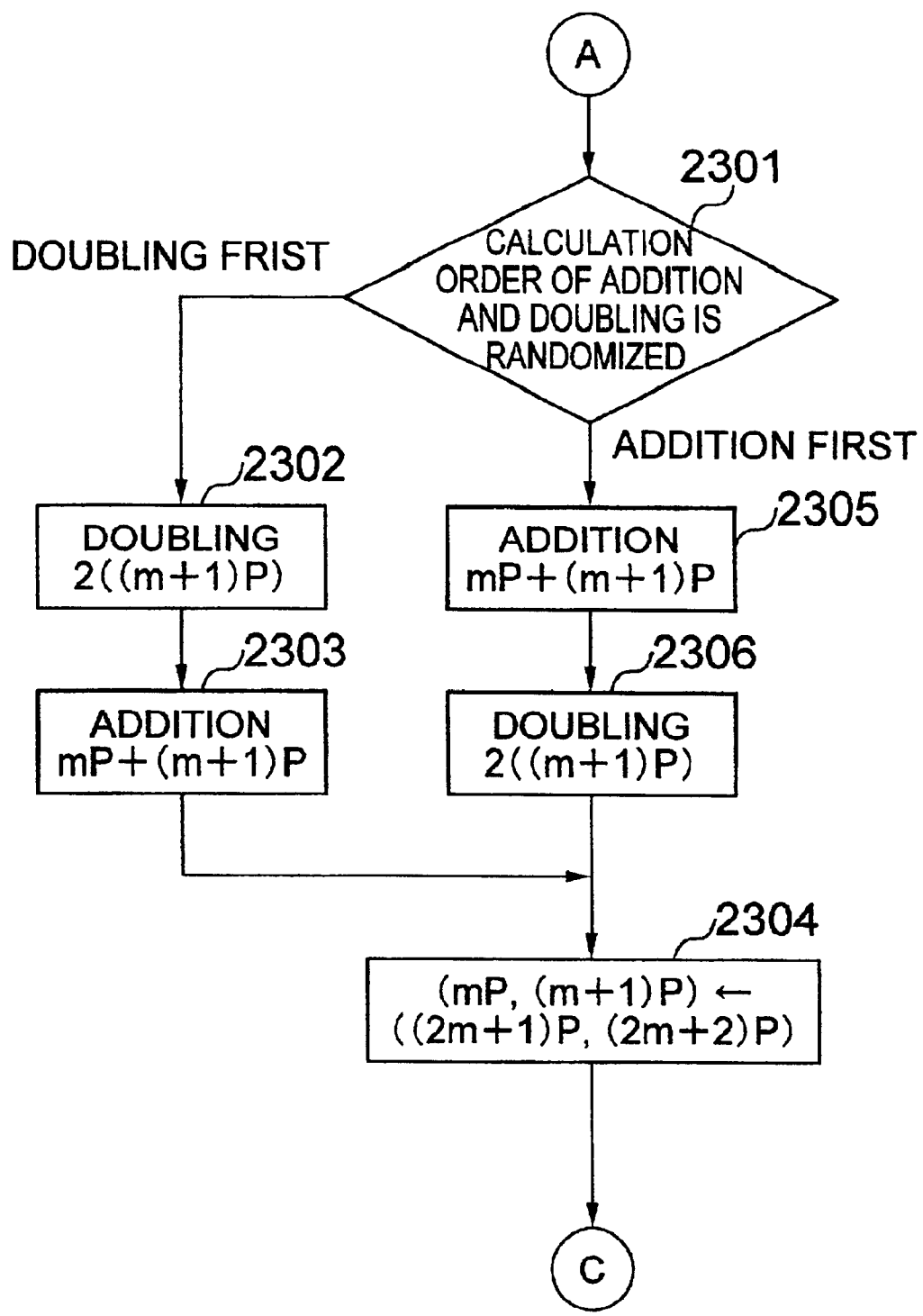
FIG. 23 is a flow chart showing the scalar multiplication calculation method according to the sixth embodiment of the present invention.
Figure 24:
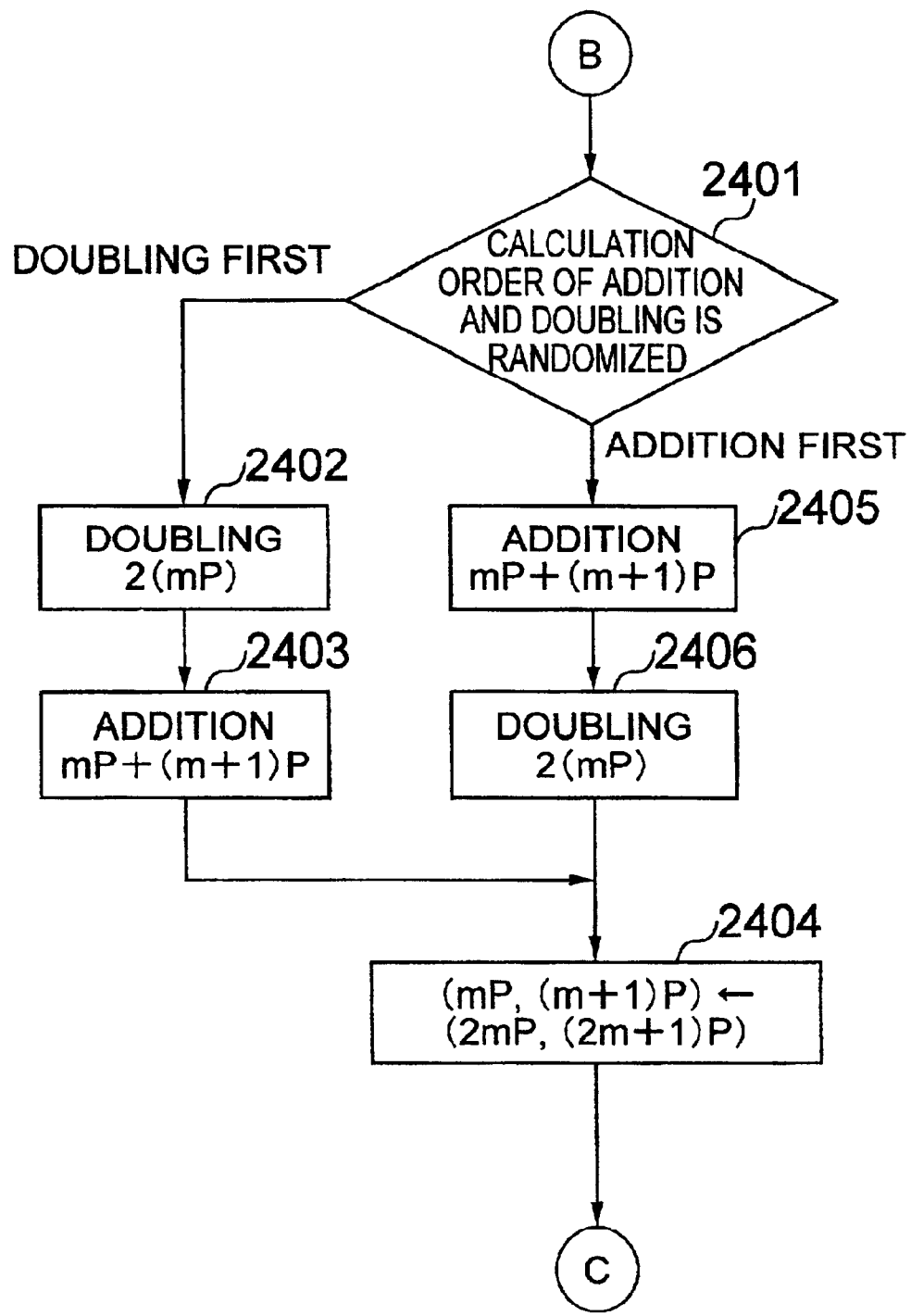
FIG. 24 is a flow chart showing the scalar multiplication calculation method according to the sixth embodiment of the present invention.
Figure 25:
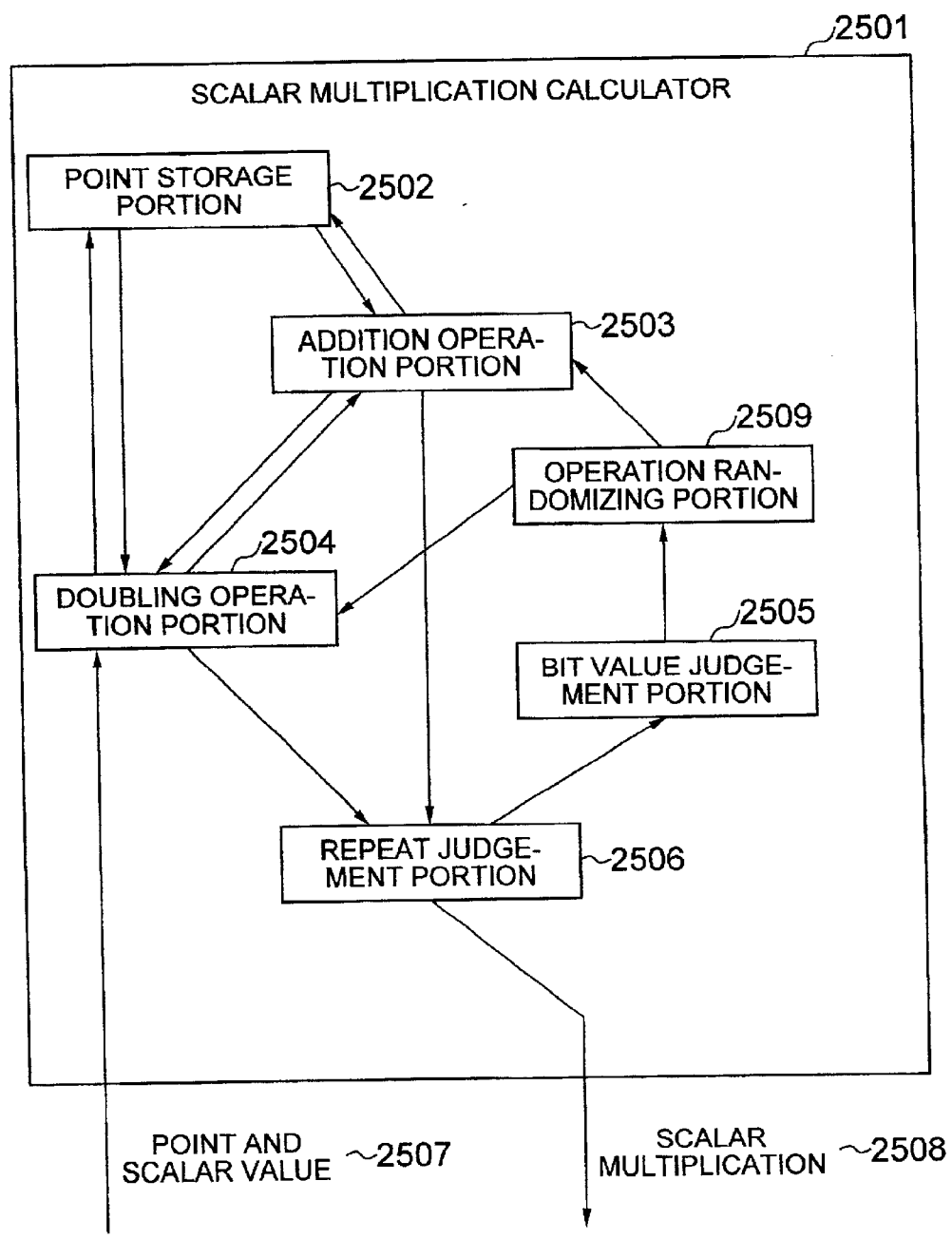
FIG. 25 a flow chart showing a flow of processing in the scalar multiplication calculation method and an apparatus therefor according to the sixth embodiment of the present invention.

FIG. 25 is a view showing a sixth embodiment of a scalar multiplication calculation method in which secret information does not leak out even if cryptographic processing process leaks out in cryptographic processing in which the secret information is used in the cryptographic processing system 1101 in FIG. 11. FIGS. 22 to 24 are a flow chart showing the scalar multiplication calculation method according to the sixth embodiment. The sixth embodiment will be described with reference to FIGS. 22 to 25.

In a scalar multiplication calculator 2501, a point and a scalar value 2507 are inputted, and a scalar multiplication 2508 is outputted in the following procedure. In Step 2201, 1 is substituted for a variable I as its initial value in order to make judgement in a repeat judgement portion 2506 as to whether repeat should be done or not. In Step 2202, a double point 2P of the point P is calculated by a doubling operation portion 2504. In Step 2203, the point P supplied to the scalar multiplication calculator 2501 and the point 2P obtained in Step 2202 are stored in a point storage portion 2502 as a point pair (P, 2P).

In Step 2204, judgement is made by the repeat judgement portion 2506 as to whether the variable I and bit length of the scalar value are coincident with each other or not. If both the variable I and the scalar value are coincident with each other, the processing goes to Step 2213. If not, the processing goes to Step 2205. In Step 2205, the variable I is increased by 1. In Step 2206, judgement is made by a bit value judgement portion 2505 as to whether the value of the $I^{th}$ bit of the scalar value is 0 or 1. If the value of the $I^{th}$ bit is 0, the processing goes to Step 2401. If the value of the $I^{th}$ bit is 1, the processing goes to Step 2301.

In Step 2301, the calculation order of addition and doubling is randomized by an operation randomizing portion 2509. To carry out the calculation in the order of addition and then doubling, the processing goes to Step 2305. To carry out the calculation in the order of doubling and then addition, the processing goes to Step 2302.

In Step 2302, by the doubling operation portion 2504, doubling 2((m+1)P) of the point (m+1)P is carried out on the basis of a point pair (mP, (m+1)P) stored in the point storage portion 2502. Thus, a point (2m+2)P is calculated. Then, the processing goes to Step 2303. In Step 2303, by an addition operation portion 2503, addition mP+(m+1)P between the point mP and the point (m+1)P is carried out on the basis of the point pair (mP, (m+1)P) stored in the point storage portion 2502. Thus, a point (2m+1)P is calculated. Then, the processing goes to Step 2304.

In Step 2305, by the addition operation portion 2503, addition mP+(m+1)P between the point mP and the point (m+1)P is carried out on the basis of the point pair (mP, (m+1)P) stored in the point storage portion 2502. Thus, a point (2m+1)P is calculated. Then, the processing goes to Step 2306. In Step 2306, by the doubling operation portion 2504, doubling 2((m+1)P) of the point (m+1)P is carried out on the basis of the point pair (mP, (m+1)P) stored in the point storage portion 2502. Thus, a point (2m+2)P is calculated. Then, the processing goes to Step 2304.

In Step 2304, the point (2m+1)P obtained in Step 2303 or 2305 and the point (2m+2)P obtained in Step 2302 or 2306 are stored in the point storage portion 2502 as a point pair ((2m+1)P, (2m+2)P) in place of the point pair (mP, (m+1)P). Then, the processing returns to Step 2204.

In Step 2401, the calculation order of addition and doubling is randomized by the operation randomizing portion 2509. To carry out the calculation in the order of addition and then doubling, the processing goes to Step 2405. To carry out the calculation in the order of doubling and then addition, the processing goes to Step 2402.

In Step 2402, by the doubling operation portion 2504, doubling 2(mP) of the point mP is carried out on the basis of a point pair (mP, (m+1)P) stored in the point storage portion 2502. Thus, a point 2mP is calculated. Then, the processing goes to Step 2403. In Step 2403, by the addition operation portion 2503, addition mP+(m+1)P between the point mP and the point (m+1)P is carried out on the basis of the point pair (mP, (m+1)P) stored in the point storage portion 2502. Thus, a point (2m+1)P is calculated. Then, the processing goes to Step 2404.

In Step 2405, by the addition operation portion 2503, addition mP+(m+1)P between the point mP and the point (m+1)P is carried out on the basis of the point pair (mP, (m+1)P) stored in the point storage portion 2502. Thus, a point (2m+1)P is calculated. Then, the processing goes to Step 2406. In Step 2406, by the doubling operation portion 2504, doubling 2(mP) of the point mP is carried out on the basis of the point pair (mP, (m+1)P) stored in the point storage portion 2502. Thus, a point 2mP is calculated. Then, the processing goes to Step 2404.

In Step 2404, the point 2mP obtained in Step 2402 or 2406 and the point (2m+1)P obtained in Step 2403 or 2405 are stored in the point storage portion 2502 as a point pair (2mP, (2m+1)P) in place of the point pair (mP, (m+1)P). Then, the processing returns to Step 2204.

In Step 2213, the point mP is outputted as the scalar multiplication 2508 on the basis of the point pair (mP, (m+1)P) stored in the point storage portion 2502. Thus, the processing is terminated.

In the same manner as that in the first embodiment, it can be proved that the point mP which is a value outputted in the above-mentioned procedure is in keeping with the scalar multiplied point dP obtained by multiplying the point P by the scalar value $\underline{d}$.

In addition, if a Montgomery-form elliptic curve is used as the elliptic curve, addition and doubling can be carried out at a high speed. Thus, scalar multiplication calculation can be carried out at a higher speed than in a Weierstrass-form elliptic curve which is generally used.

Also with respect to an elliptic curve defined on a finite field of characteristic 2, if a high-speed addition and doubling calculation method is used for addition and doubling calculation in the above-mentioned procedure, scalar multiplication calculation can be carried out at a higher speed than general scalar multiplication calculation for an elliptic curve defined on a finite field of characteristic 2.

Figure 26:
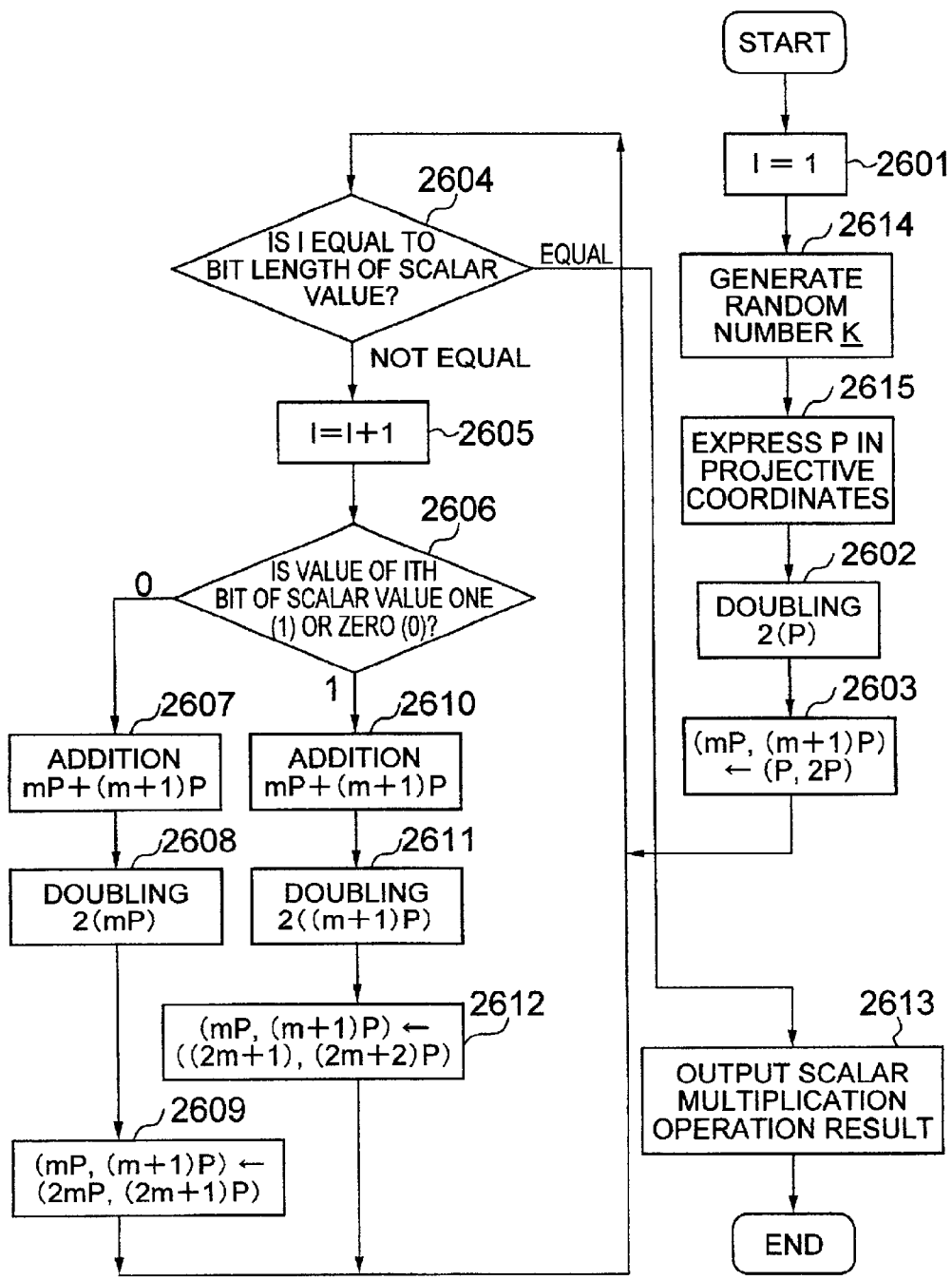
FIG. 26 is a flow chart showing a scalar multiplication calculation method according to a seventh embodiment of the present invention.
Figure 27:
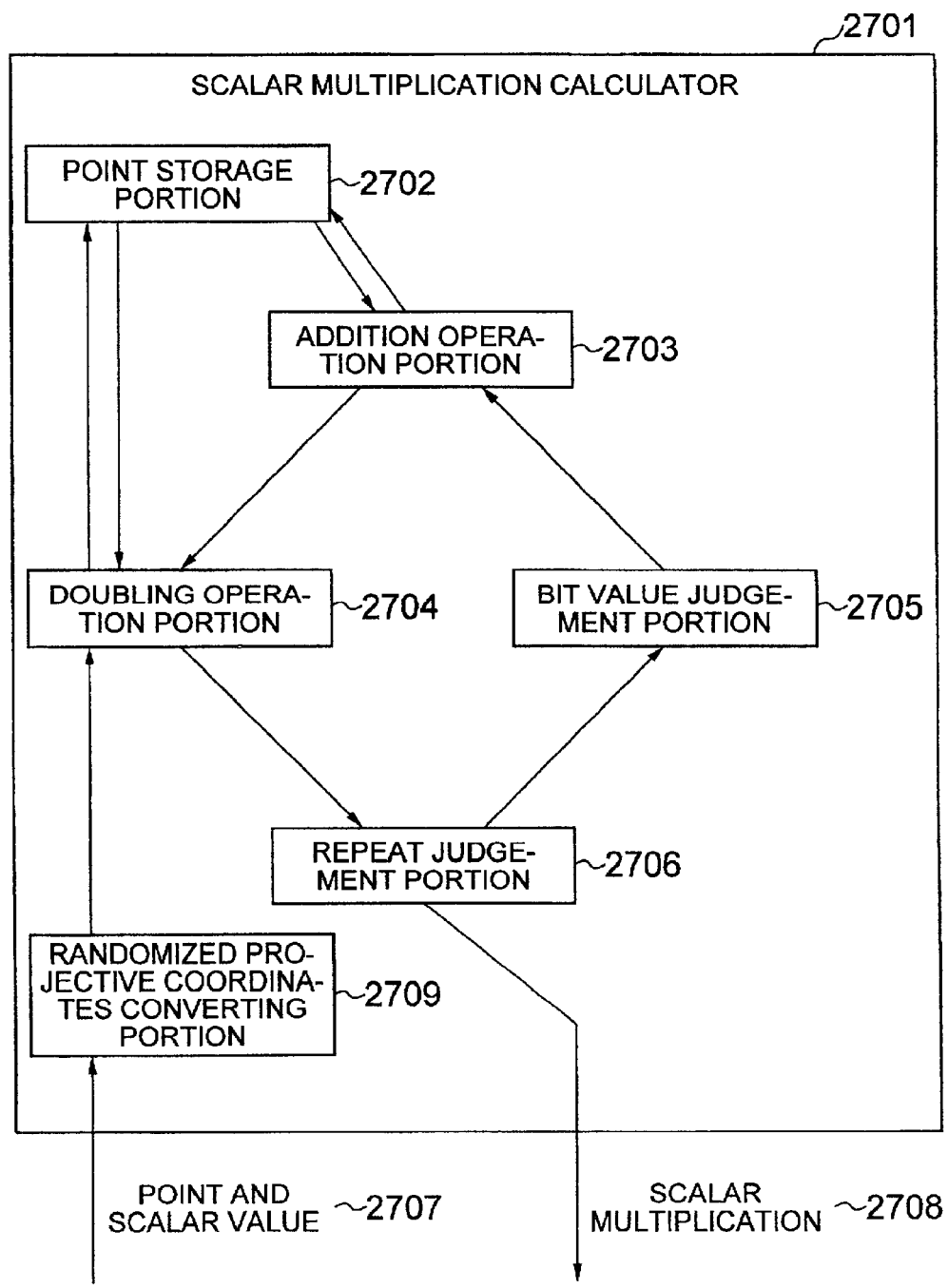
FIG. 27 a flow chart showing a flow of processing in the scalar multiplication calculation method and an apparatus therefor according to the seventh embodiment of the present invention.

FIG. 27 is a view showing a seventh embodiment of a scalar multiplication calculation method in which secret information does not leak out even if cryptographic processing process leaks out in cryptographic processing in which the secret information is used in the cryptographic processing system 1101 in FIG. 11. FIG. 26 is a flow chart showing the scalar multiplication calculation method according to the seventh embodiment. The seventh embodiment will be described with reference to FIGS. 26 and 27.

In a scalar multiplication calculator 2701, a point and a scalar value 2707 are inputted, and a scalar multiplication 2708 is outputted in the following procedure. In Step 2601, 1 is substituted for a variable I as its initial value in order to make judgement in a repeat judgement portion 2706 as to whether repeat should be done or not. In Step 2614, a random number $\underline{k}$ is generated by a randomized projective coordinates converting portion 2709. In Step 2615, by use of the random number $\underline{k}$ generated in Step 2614, a point P is expressed as P=(kx, ky, k) in projective coordinates by the randomized projective coordinates converting portion 2709. Here, it is assumed that the point P is expressed as P=(x, y) in affine coordinates. In Step 2602, a double point 2P of the point P expressed as P=(kx, ky, k) in Step 2615 is calculated by a doubling operation portion 2704. In Step 2603, the point P supplied to the scalar multiplication calculator 2701 and expressed as P=(kx, ky, k) in Step 2615, and the point 2P obtained in Step 2602 are stored in a point storage portion 2702 as a point pair (P, 2P).

In Step 2604, judgement is made by the repeat judgement portion 2706 as to whether the variable I and bit length of the scalar value are coincident with each other or not. If both the variable I and the scalar value are coincident with each other, the processing goes to Step 2613. If not, the processing goes to Step 2605. In Step 2605, the variable I is increased by 1. In Step 2606, judgement is made by a bit value judgement portion 2705 as to whether the value of the $I^{th}$ bit of the scalar value is 0 or 1. If the value of the $I^{th}$ bit is 0, the processing goes to Step 2607. If the value of the $I^{th}$ bit is 1, the processing goes to Step 2610.

In Step 2607, by an addition operation portion 2703, addition mP+(m+1)P between a point mP and a point (m+1)P is carried out on the basis of a point pair (mP, (m+1)P) stored in the point storage portion 2702. Thus, a point (2m+1)P is calculated. Then, the processing goes to Step 2608. In Step 2608, by the doubling operation portion 2704, doubling 2(mP) of the point mP is carried out on the basis of the point pair (mP, (m+1)P) stored in the point storage portion 2702. Thus, a point 2mP is calculated. Then, the processing goes to Step 2609. In Step 2609, the point 2mP obtained in Step 2608 and the point (2m+1)P obtained in Step 2607 are stored in the point storage portion 2702 as a point pair (2mP, (2m+1)P) in place of the point pair (mP, (m+1)P). Then, the processing returns to Step 2604.

In Step 2610, by the addition operation portion 2703, addition mP+(m+1)P between a point mP and a point (m+1)P is carried out on the basis of a point pair (mP, (m+1)P) stored in the point storage portion 2702. Thus, a point (2m+1)P is calculated. Then, the processing goes to Step 2611. In Step 2611, by the doubling operation portion 2704, doubling 2((m+1)P) of the point (m+1)P is carried out on the basis of the point pair (mP, (m+1)P) stored in the point storage portion 2702. Thus, a point (2m+2)P is calculated. Then, the processing goes to Step 2612. In Step 2612, the point (2m+1)P obtained in Step 2610 and the point (2m+2)P obtained in Step 2611 are stored in the point storage portion 2702 as a point pair ((2m+1)P, (2m+2)P) in place of the point pair (mP, (m+1)P). Then, the processing returns to Step 2604.

In Step 2613, the point mP is outputted as the scalar multiplication 2708 on the basis of the point pair (mP, (m+1)P) stored in the point storage portion 2702. Thus, the processing is terminated.

In the same manner as that in the first embodiment, it can be proved that the point mP which is a value outputted in the above-mentioned procedure is in keeping with the scalar multiplied point dP obtained by multiplying the point P by the scalar value d.

Further, the reason why information about any scalar value as secret information does not leak out even if scalar multiplication calculation process leaks out in the above-mentioned procedure is similar to the reason described in the first embodiment. Further, in the scalar multiplication calculation, it is proved that information about any scalar value does not leak out even against an attack method of observing whether a specific value appears or not in the scalar multiplication calculation, and inferring a scalar value from the observing result. This is because multiplying by a random value is first carried out so that the appearance of the specific value cannot be inferred.

In addition, when a Montgomery-form elliptic curve is used as the elliptic curve, scalar multiplication calculation can be carried out at a higher speed than Weierstrass-form elliptic curve in the same manner as that in the first embodiment.

Also with respect to an elliptic curve defined on a finite field of characteristic 2, if a high-speed addition and doubling calculation method is used for addition and doubling calculation in the above-mentioned procedure, scalar multiplication calculation can be carried out at a higher speed than general scalar multiplication calculation for an elliptic curve defined on a finite field of characteristic 2, in the same manner as that in the first embodiment.

Figure 28:
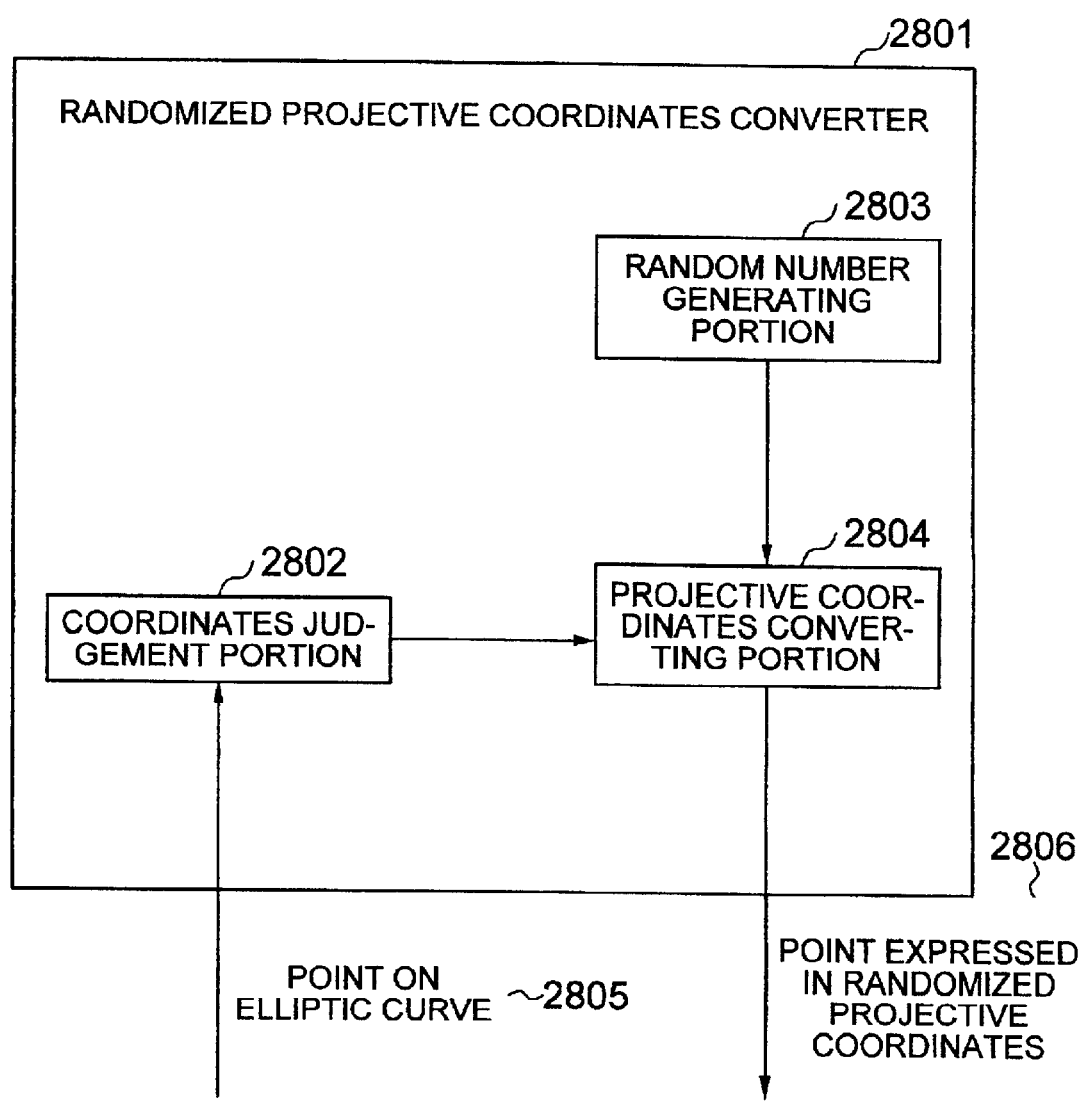
FIG. 28 is a view showing a randomized projective coordinates converter in FIG. 27.

FIG. 28 is a view showing an embodiment of a randomized projective coordinates converter for use as the randomized projective coordinates converting portion 2709 in FIG. 27. FIG. 29 is a flow chart showing a randomized projective coordinates converting method in the randomized projective coordinates converter.

In a randomized projective coordinates converter 2801, a point 2805 on an elliptic curve is inputted, and a point 2806 expressed in randomized projective coordinates is outputted in the following procedure. In Step 2901, by a coordinates judgement portion 2802, judgement is made as to whether the given point 2805 on the elliptic curve is expressed in affine coordinates or in projective coordinates. If the point 2805 is expressed in affine coordinates, the processing goes to Step 2902. If the point 2805 is expressed in projective coordinates, the processing goes to Step 2903. In Step 2902, the point expressed in affine coordinates is expressed in projective coordinates as follows. On the assumption that the point expressed in affine coordinates is (x, y), it is expressed by (x, y, 1) in projective coordinates.

In Step 2903, a random number k is generated by a random number generating portion 2803. In Step 2904, by a projective coordinates converting portion 2804, the given point expressed in projective coordinates is expressed in randomized projective coordinates as follows. On the assumption that the given point is (x, y, z), the respective coordinates are multiplied by the random number k generated by the random number generating portion 2803, and a point 2806 expressed as P=(kx, ky, kz) in randomized projective coordinates is outputted.

In projective coordinates, all the points obtained by multiplying respective coordinates by any number k other than 0 are regarded as the same point. That is, (x, y, z) and (kz, ky, kz) represent the same point.

In addition, to save a memory or the like, (x, y, 1) in Step 2902 may not be stored actually but be virtually regarded as being expressed by (x, y, 1). Then, (kx, ky, k) may be stored actually when it is expressed in Step 2904.

Figure 3:
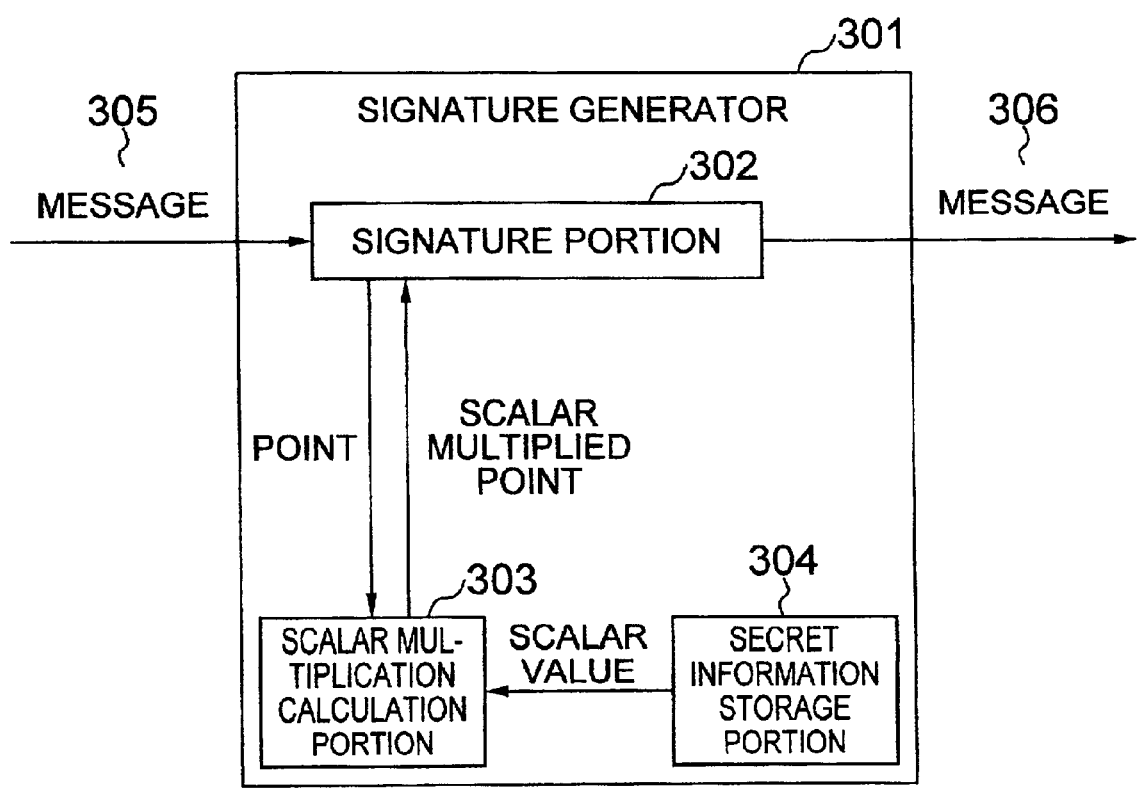
FIG. 3 is a configuration view of a signature generator according to a mode of carrying out the present invention.
Figure 18:
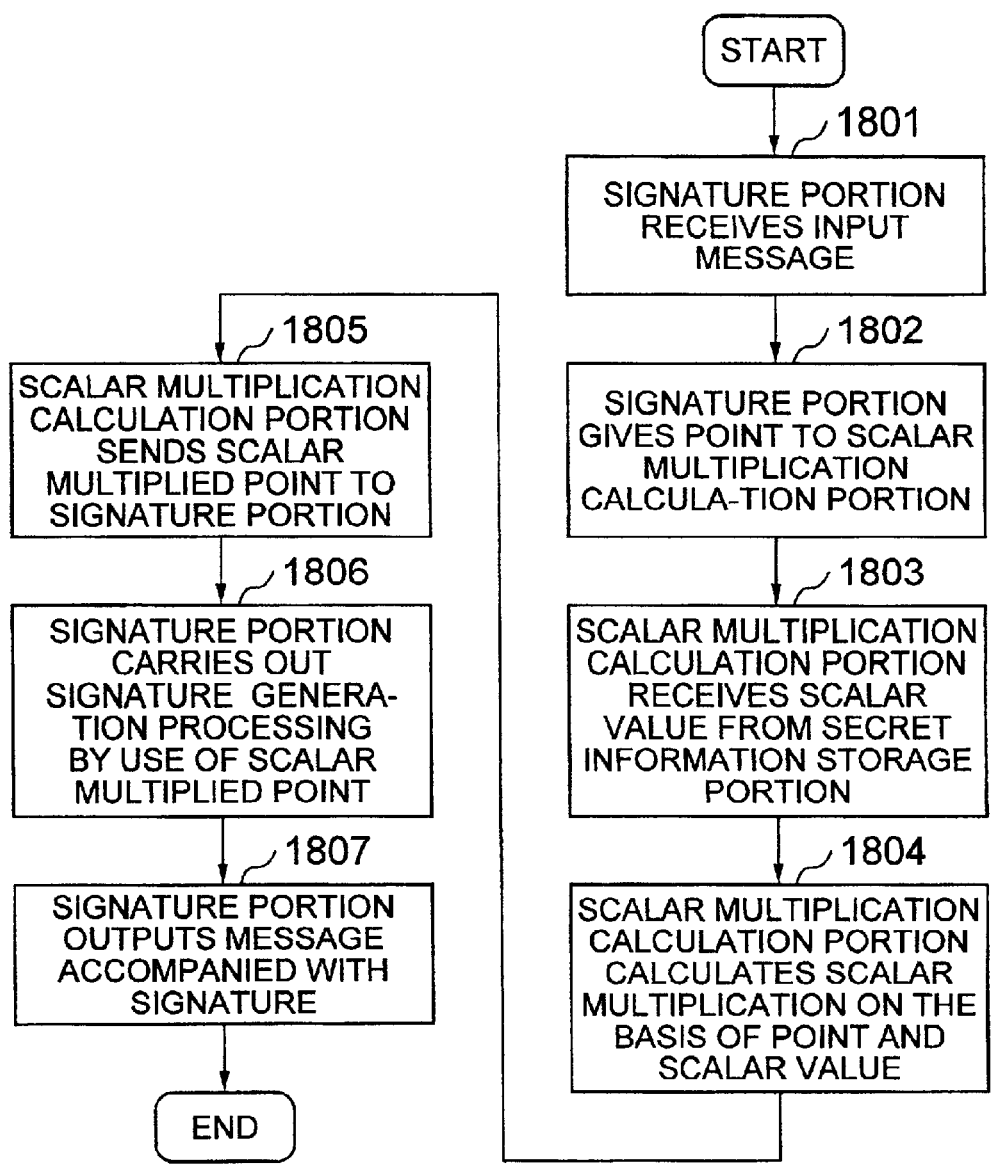
FIG. 18 is a flow chart showing a signature generation method in the signature generator in FIG. 3.
Figure 19:
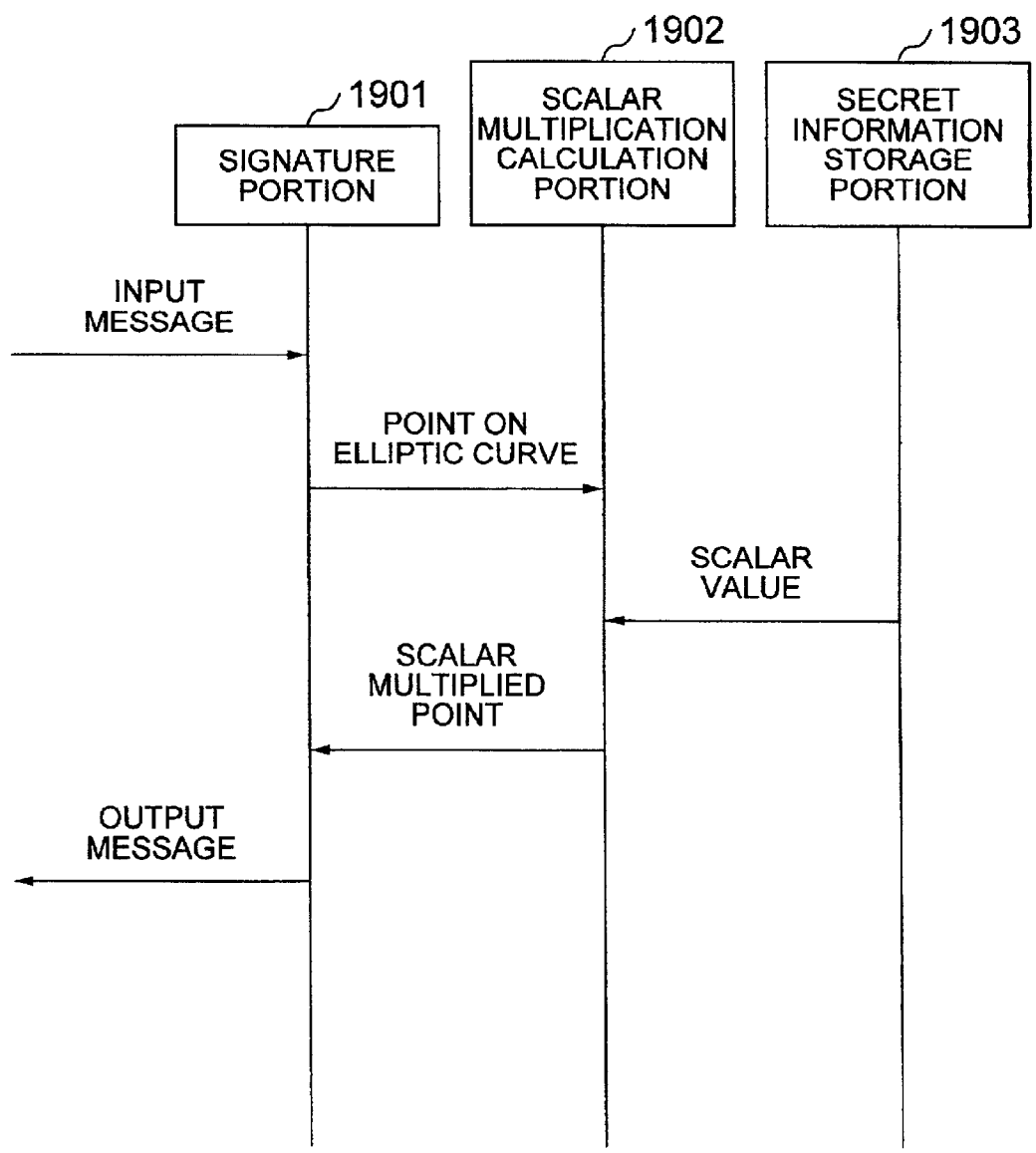
FIG. 19 is a sequence view showing a flow of processing in the signature generator in FIG. 3.

FIG. 3 shows the configuration when the cryptographic processing system of the mode described in FIG. 11 is used as a signature generator. A cryptographic processing portion 1102 in FIG. 11 corresponds to a signature portion 302 in a signature generator 301 in FIG. 3. FIG. 18 is a flow chart showing a flow of processing in the signature generator in FIG. 3. FIG. 19 is a sequence view showing the flow of processing in the signature generator in FIG. 3.

In FIG. 18, the signature generator 301 outputs a message 306 accompanied with a signature, on the basis of a given message 305 as follows. When the message 305 is supplied to the signature generator 301, the signature portion 302 receives the message 305 (Step 1801). The signature portion 302 gives a scalar multiplication calculation portion 303 a point on an elliptic curve corresponding to the input message 305 (Step 1802). The scalar multiplication calculation portion 303 receives a scalar value, which is secret information, from a secret information storage portion 304 (Step 1803). The scalar multiplication calculation portion 303 calculates a scalar multiplied point on the basis of the received point and the received scalar value in such a scalar multiplication calculation method that secret information does not leak even if scalar multiplication calculation process leaks out (Step 1804). The scalar multiplication calculation portion 303 sends the calculated scalar multiplied point to the signature portion 302 (Step 1805). The signature portion 302 carries out signature generation processing based on the scalar multiplied point received from the scalar multiplication calculation portion 303 (Step 1806). The signature portion 302 outputs a message 306 accompanied with a signature as a result of the signature generation processing (Step 1807).

The above-mentioned processing procedure will be described with reference to the sequence view of FIG. 19. First, description will be made about processing executed by a signature portion 1901 (302 in FIG. 3). The signature portion 1901 receives an input message. The signature portion 1901 selects a point on an elliptic curve on the basis of the input message, gives the point on the elliptic curve to a scalar multiplication calculation portion 1902, and receives a scalar multiplied point from the scalar multiplication calculation portion 1902. The signature portion 1901 carries out signature generation processing by use of the received scalar multiplied point, and outputs an output message as a result of the signature generation processing.

Next, description will be made about processing executed by the scalar multiplication calculation portion 1902 (303 in FIG. 3). The scalar multiplication calculation portion 1902 receives a point on an elliptic curve from the signature portion 1901. The scalar multiplication calculation portion 1902 receives a scalar value from a secret information storage portion 1903. The scalar multiplication calculation portion 1902 calculates a scalar multiplied point on the basis of the received point on the elliptic curve and the received scalar value in such a scalar multiplication calculation method that secret information does not leak out even if scalar multiplication calculation process leaks out. Then, the scalar multiplication calculation portion 1902 sends the scalar multiplied point to the signature portion 1901.

Last, description will be made about processing executed by the secret information storage portion 1903 (304 in FIG. 3). The secret information storage portion 1903 sends a scalar value to the scalar multiplication calculation portion 1902 so that the scalar multiplication calculation portion 1902 can calculate a scalar multiplied point.

The scalar multiplication calculation described in the first to seventh embodiments is applied, as it is, to the scalar multiplication calculation carried out by the scalar multiplication calculation portion 303. Therefore, in this scalar multiplication calculation, information about any scalar value, which is secret information, does not leak out even if scalar multiplication calculation process leaks out. Accordingly, even if signature generation processing process leaks out when the signature portion 302 carries out the signature generation processing, information about secret information does not leak out. This is because only the scalar multiplication calculation portion 303 deals with the scalar value which is the secret information.

Figure 10:
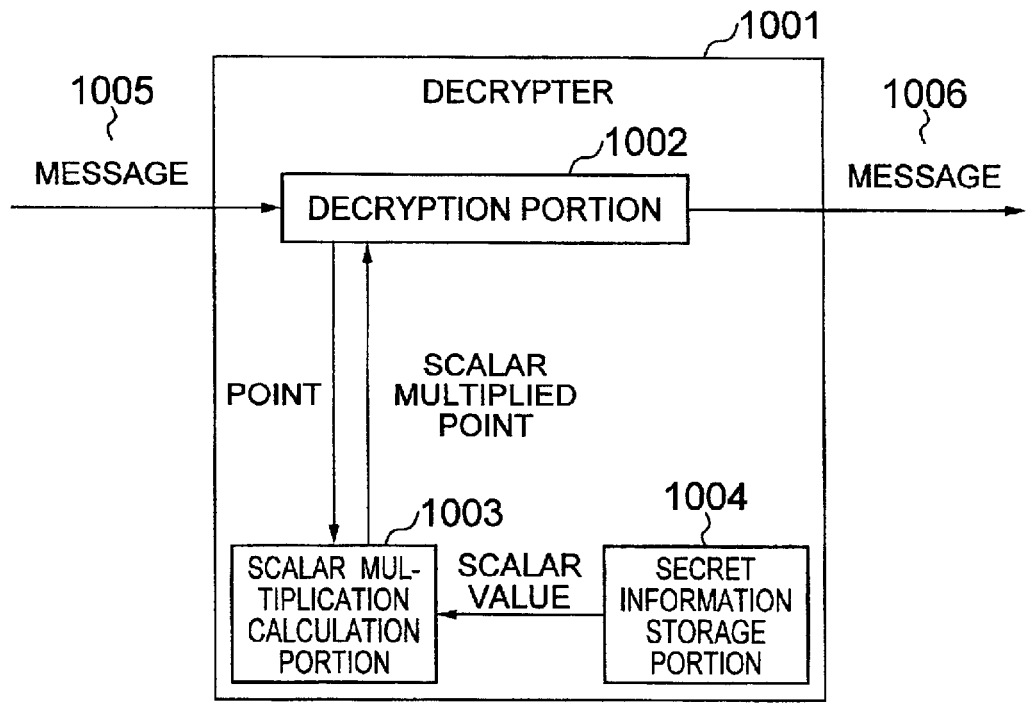
FIG. 10 is a configuration view of a decrypter according to the mode of carrying out the present invention.
Figure 20:
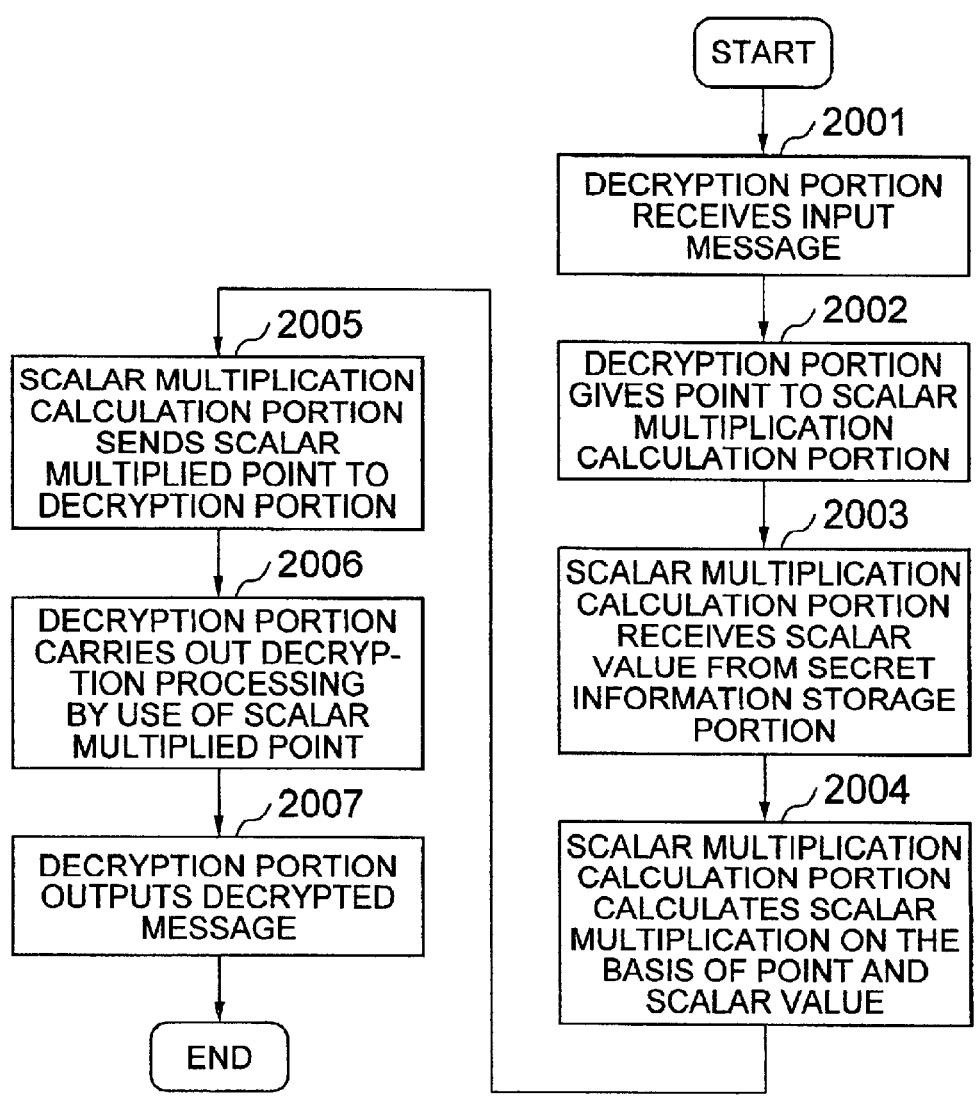
FIG. 20 is a flow chart showing a decryption method in the decrypter in FIG. 10.
Figure 21:
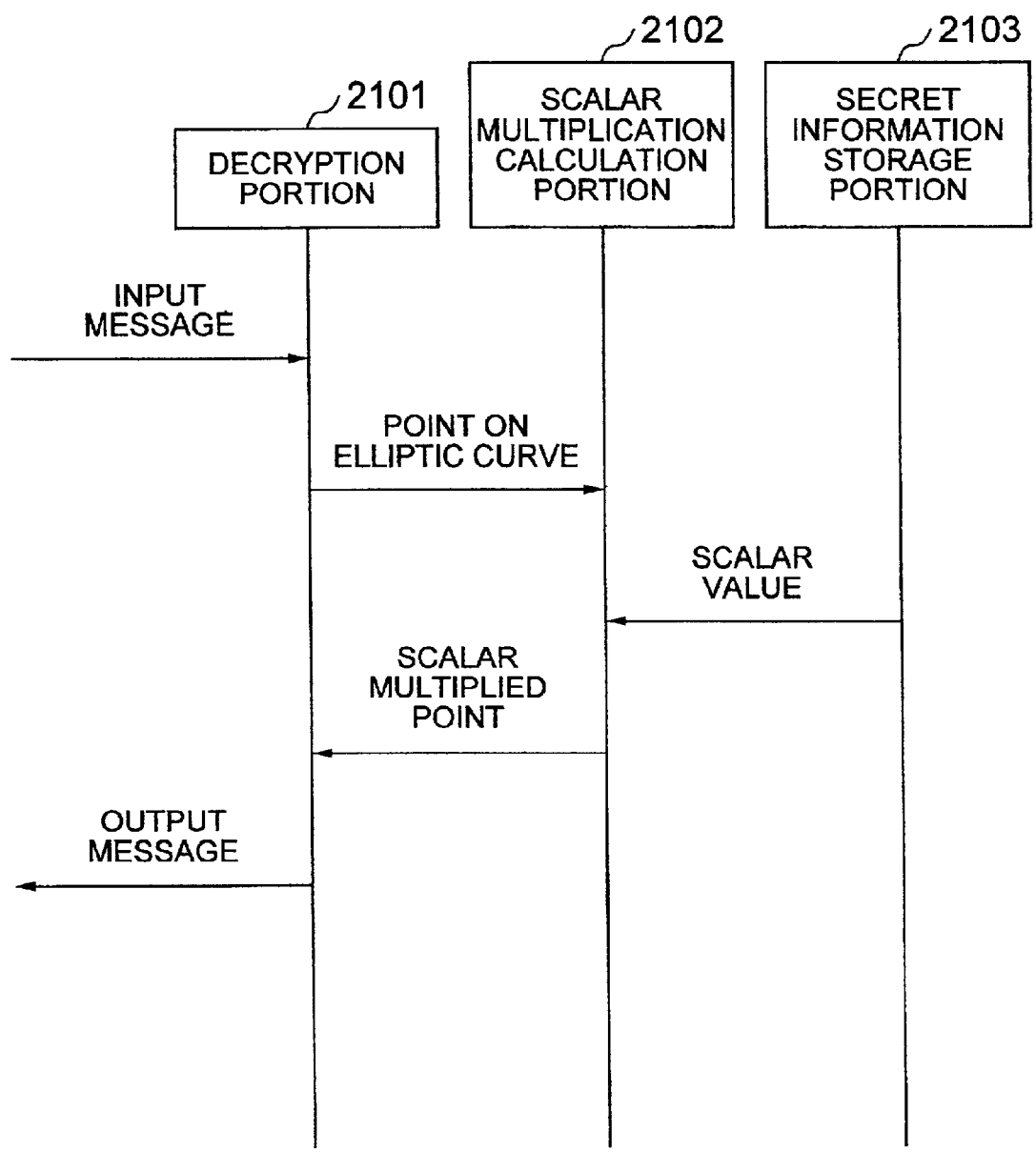
FIG. 21 is a sequence view showing a flow of processing in the decrypter in FIG. 10.

FIG. 10 shows the configuration when the cryptographic processing system of the mode described in FIG. 11 is used as a decrypter. A cryptographic processing portion 1102 in FIG. 11 corresponds to a decryption portion 1002 in a decrypter 1001 in FIG. 10. FIG. 20 is a flow chart showing a flow of processing in the decrypter in FIG. 10. FIG. 21 is a sequence view showing the flow of processing in the decrypter in FIG. 10.

In FIG. 20, the decrypter 1001 outputs a message 1006 decrypted from a given message 1005 as follows. When the message 1005 is supplied to the decrypter 1001, the decryption portion 1002 receives the message 1005 (Step 2001). The decryption portion 1002 gives a scalar multiplication calculation portion 1003 a point on an elliptic curve corresponding to the input message 1005 (Step 2002). The scalar multiplication calculation portion 1003 receives a scalar value, which is secret information, from a secret information storage portion 1004 (Step 2003). The scalar multiplication calculation portion 1003 calculates a scalar multiplied point on the basis of the received point and the received scalar value in such a scalar multiplication calculation method that secret information does not leak out even if scalar multiplication calculation process leaks out (Step 2004). The scalar multiplication calculation portion 1003 sends the calculated scalar multiplied point to the decryption portion 1002 (Step 2005). The decryption portion 1002 carries out decryption processing based on the scalar multiplied point received from the scalar multiplication calculation portion 1003 (Step 2006). The decryption portion 1002 outputs a decrypted message 1006 as a result of the decryption processing (Step 2007).

The above-mentioned processing procedure will be described with reference to the sequence view of FIG. 21. First, description will be made about processing executed by decryption portion 2101 (1002 in FIG. 10). The decryption portion 2101 receives an input message. The decryption portion 2101 selects a point on an elliptic curve on the basis of the input message, gives the point on the elliptic curve to a scalar multiplication calculation portion 2102, and receives a scalar multiplied point from the scalar multiplication calculation portion 2102. The decryption portion 2101 carries out decryption processing by use of the received scalar multiplied point, and outputs an output message as a result of the decryption processing.

Next, description will be made about processing executed by the scalar multiplication calculation portion 2102 (1003 in FIG. 10). The scalar multiplication calculation portion 2102 receives a point on an elliptic curve from the decryption portion 2101. The scalar multiplication calculation portion 2102 receives a scalar value from a secret information storage portion 2103. The scalar multiplication calculation portion 2102 calculates a scalar multiplied point on the basis of the received point on the elliptic curve and the received scalar value in such a scalar multiplication calculation method that secret information does not leak out even if scalar multiplication calculation process leaks out. Then, the scalar multiplication calculation portion 2102 sends the scalar multiplied point to the decryption portion 2101.

Last, description will be made about processing executed by the secret information storage portion 2103 (1004 in FIG. 10). The secret information storage portion 2103 sends a scalar value to the scalar multiplication calculation portion 2102 so that the scalar multiplication calculation portion 2102 can calculate a scalar multiplied value.

The scalar multiplication calculation described in the first to seventh embodiments is applied, as it is, to the scalar multiplication calculation carried out by the scalar multiplication calculation portion 1003. Therefore, in this scalar multiplication calculation, information about any scalar value, which is secret information, does not leak out even if scalar multiplication calculation process leaks out. Accordingly, even if decryption processing process leaks out when the decryption portion 1002 carries out the decryption processing, information about secret information does not leak out. This is because only the scalar multiplication calculation portion 1003 deals with the scalar value which is the secret information.

What is claimed is:

1. A scalar multiplication calculation method in an elliptic curve cryptosystem for calculating a scalar multiplied point on the basis of a scalar value and a point on an elliptic curve, comprising the steps of:

determining a value of a bit of said scalar value; and executing operations on said elliptic curve a predetermined number of times and in a predetermined order without depending on said determined value of said bit to calculate a scalar multiplied point;

wherein said operations include calculations of addition and doubling, said operations being selected for scalar values of one or zero, the scalar value determining the addition and doubling calculations executed.

2. A scalar multiplication calculation method in an elliptic curve cryptosystem for calculating a scalar multiplied point on the basis of a scalar value and a point on an elliptic, comprising the steps of:

determining value of a bit of said scalar value; and executing calculations of addition on said elliptic curve and doubling on said elliptic curve in the order that said doubling on said elliptic curve is executed after said addition on said elliptic curve is executed to calculate a scalar multiplied point;

wherein said addition and doubling calculations are selected for scalar values of one or zero, the scalar value determining the addition and doubling calculations executed.

3. A scalar multiplication calculation method in an elliptic curve cryptosystem for calculating a scalar multiplied point on the basis of a scalar value and a point on an elliptic curve, comprising the steps of:

determining a value of a bit of said scalar value; and executing calculations of addition on said elliptic curve and doubling on said elliptic curve in the order that said addition on said elliptic curve is executed after said doubling on said elliptic curve is executed to calculate a scalar multiplied point;

wherein said addition and doubling calculations are selected for scaler values of one or zero, the scaler value determining the addition and doubling calculations executed.

4. A scaler multiplication calculation method in an elliptic curve cryptosystem for calculating a scaler multiplied point on the basis of a scalar value and a point on an elliptic curve, comprising the steps of:

determining a value of a bit of said scaler value; and executing calculations of addition on said elliptic curve and doubling on said elliptic curve simultaneously to calculate a scaler multiplied point;

wherein said addition and doubling calculations are selected for scalar values of one or zero, the scaler value determining the addition and doubling calculations executed.

5. A scalar multiplication calculation method in an elliptic curve cryptosystem for calculating a scalar multiplied point on the basis of a scalar value and a point on an elliptic curve, comprising the steps of:

executing addition on said elliptic curve;

determining a value of a bit of said scalar value; and executing doubling calculations on said elliptic curve to calculate a scalar multiplied point;

wherein said doubling calculations are selected for scalar values of one or zero, the scalar value determining the doubling calculations executed.

6. A scalar multiplication calculation method in an elliptic curve cryptosystem for calculating a scalar multiplied point on the basis of a scalar value and a point on an elliptic curve, comprising the steps of:

randomizing calculation order of addition on said elliptic curve and doubling on said elliptic curve;

determining a value of a bit of said scalar value; and executing said addition on said elliptic curve and said doubling on said elliptic curve in said order randomized by said step of randomizing calculation order of addition on said elliptic curve and doubling on said elliptic curve to calculate a scalar multiplied point;

wherein said calculations of addition and doubling are selected for scalar values of one or zero, the scalar value determining the addition and doubling calculations executed.

7. A scalar multiplication calculation method in an elliptic curve cryptosystem for calculating a scalar multiplied point on the basis of a scalar value and a point on an elliptic curve, comprising the steps of:

determining a value of a bit of said scalar value;

randomizing calculation order of addition on said elliptic curve and doubling on said elliptic curve; and executing said addition on said elliptic curve and said doubling on said elliptic curve in said order randomized by said step of randomizing calculation order of addition on said elliptic curve and doubling on said elliptic curve to calculate a scalar multiplied point;

wherein said calculations of addition and doubling are selected for scalar values of one or zero, the scalar value determining the addition and doubling calculations executed.

8. A data generation method for generating second data from first data, comprising the step of calculating a scalar multiplication by use of a scalar multiplication calculation method according to any one of claims 1 to 7.

9. A signature generation method for generating signature data from data, comprising the step of calculating a scalar multiplication by use of a scalar multiplication calculation method according to any one of claims 1 to 7.

10. A decryption method for generating decrypted data from encrypted data, comprising the step of calculating a scalar multiplication by use of a scalar multiplication calculation method according to any one of claims 1 to 7.

11. A recording medium for storing a program relating to a scalar multiplication calculation method according to any one of claims 1 to 7.

12. A scalar multiplication calculation method according to any one of claims 1 to 7, wherein a Montgomery-form elliptic curve is used as said elliptic curve.

13. A scalar multiplication calculation method according to any one of claims 1 to 7, wherein an elliptic curve defined on a finite field of characteristic 2 is used as said elliptic curve.

14. The multiplication calculation method according to claim 1, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

15. The multiplication calculation method according to claim 2, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

16. The multiplication calculation method according to claim 3, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

17. The multiplication calculation method according to claim 4, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

18. The multiplication calculation method according to claim 5, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

19. The multiplication calculation method according to claim 6, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

20. The multiplication calculation method according to claim 7, wherein when the value of the bit of the scalar value is 0, the addition calculation includes adding a point mP to a double point of the point (m+1)P and the doubling calculations include doubting the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

21. A scalar multiplication calculator for calculating a scalar multiplied point on the basis of a scalar value and a point on an elliptic curve in an elliptic curve cryptosystem, comprising:

bit value judgment means for determining a value of a bit of said scalar value;

addition operation means for executing addition calculations on said elliptic curve; and doubling operation means for executing doubling calculations on said elliptic curve;

wherein after the value of said bit of scalar value is determined by said bit value judgment means, said addition on said elliptic curve and said doubling on said elliptic curve are executed by said addition operation means and said doubling operation means a predetermined number of times and in a predetermined order so as to calculate a scalar multiplied point, wherein said addition and doubling calculations are selected for scalar values of one or zero, the scalar value determining the selection of said addition and doubling calculations executed.

22. The multiplication calculation method according to claim 21, wherein when the value of the bit of the scalar value is 0, the addition calculation includes adding a point mP to a double point of the point (m+1)P and the doubling calculations include doubling the point mP to obtain 2(mP) where m comprises the scalar value and P comprises the point, and wherein when the value of the bit of the scalar value is 1, the addition calculation includes adding a point mP to a double point of the point (m+1)P and the doubling calculations include doubling the double point of the point (m+1)P to obtain 2((m+1)P) where m comprises the scalar value and P comprises the point.

* * * * *